United States Patent
Shibata

(10) Patent No.: US 11,750,852 B2
(45) Date of Patent: Sep. 5, 2023

(54) SYSTEM, METHOD, AND COMPUTER-READABLE MEDIUM INCLUDING PROGRAM FOR PROVIDING LIVE VIDEO DISTRIBUTION SERVICE

(71) Applicant: DeNA Co., Ltd., Tokyo (JP)

(72) Inventor: Kazuto Shibata, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 17/088,710

(22) Filed: Nov. 4, 2020

(65) Prior Publication Data
US 2021/0152854 A1    May 20, 2021

(30) Foreign Application Priority Data
Nov. 15, 2019    (JP) .................................. 2019-207487

(51) Int. Cl.
*H04N 21/2187*    (2011.01)
*H04N 21/2743*    (2011.01)
*H04L 51/046*    (2022.01)
*H04L 51/52*    (2022.01)

(52) U.S. Cl.
CPC ....... *H04N 21/2187* (2013.01); *H04L 51/046* (2013.01); *H04L 51/52* (2022.05); *H04N 21/2743* (2013.01)

(58) Field of Classification Search
CPC ... H04L 51/046; H04L 51/32; H04N 21/2187; H04N 21/2743
See application file for complete search history.

(56) References Cited

U.S. PATENT DOCUMENTS

| | | | |
|---|---|---|---|
| 10,135,776 | B1* | 11/2018 | Brown .................... H04L 51/00 |
| 2014/0019882 | A1* | 1/2014 | Chew ..................... G06Q 10/10 |
| | | | 715/753 |
| 2014/0337890 | A1 | 11/2014 | Choi et al. |
| 2016/0016077 | A1* | 1/2016 | Yokota .................... A63F 13/31 |
| | | | 463/42 |

(Continued)

FOREIGN PATENT DOCUMENTS

| | | |
|---|---|---|
| JP | 2013-55554 A | 3/2013 |
| JP | 2015-46648 A | 3/2015 |
| JP | 2019-022219 A | 2/2019 |

OTHER PUBLICATIONS

Notice of Reasons for Refusal issued in corresponding Japanese Patent Application No. 2019-207487 dated Feb. 9, 2021, with translations (8 pages).

(Continued)

*Primary Examiner* — Alazar Tilahun
(74) *Attorney, Agent, or Firm* — Osha Bergman Watanabe & Burton LLP

(57) ABSTRACT

A video distribution server according to one embodiment of the present disclosure promotes entry of a new viewer into a live video distribution (live streaming) service. The server provides a user with the live video distribution service for distributing and viewing a video in real time via a user terminal. The server generates a message based on input information by a viewer of the video being distributed, and posts the message on an SNS by a distributor of the video, and thus allows a user of the SNS to know a situation and an atmosphere of live distribution in the video distribution service.

15 Claims, 24 Drawing Sheets

(56) References Cited

U.S. PATENT DOCUMENTS

| | | | | |
|---|---|---|---|---|
| 2016/0182709 A1* | 6/2016 | Kim | ............... | H04W 4/18 |
| | | | | 455/466 |
| 2016/0294753 A1* | 10/2016 | Centner | ............... | H04L 51/12 |
| 2017/0149724 A1* | 5/2017 | Hintermeister | ......... | H04L 51/52 |
| 2017/0214945 A1* | 7/2017 | Chang | ............... | H04N 21/6125 |
| 2018/0032222 A1* | 2/2018 | Wang | ............... | G06F 16/00 |
| 2018/0260483 A1* | 9/2018 | Nagasaka | ............. | G06Q 50/01 |

OTHER PUBLICATIONS

Notice of Reasons for Refusal issued in corresponding Japanese Patent Application No. 2019-207487 dated Jun. 22, 2021, with translation (12 pages).

* cited by examiner

USER INFORMATION TABLE 411

| USER ACCOUNT |
|---|
| BASIC INFORMATION |
| DISTRIBUTION HISTORY INFORMATION |
| VIEWING HISTORY INFORMATION |
| FOLLOWING USER INFORMATION |
| FOLLOWER INFORMATION |
| FAMILY INFORMATION |
| RANKING |
| RANKING METER VALUE |
| NUMBER OF HELD COINS |
| NUMBER OF HELD DIAMONDS |
| TAG POINT INFORMATION |
| TAG INFORMATION |
| CLASSIFICATION TEXT |
| ... |

FIG. 3

| RANKING BAND | S | | | A | | | B | | | C | | | D | | | E |
|---|---|---|---|---|---|---|---|---|---|---|---|---|---|---|---|---|
| RANKING | S+ | S | S- | A+ | A | A- | B+ | B | B- | C+ | C | C- | D+ | D | D- | E |

FIG. 4

DISTRIBUTION MANAGEMENT TABLE 412

| DISTRIBUTION ID |
|---|
| DISTRIBUTOR USER ACCOUNT |
| DISTRIBUTION DATE AND TIME |
| DISTRIBUTION DURATION |
| NUMBER OF VIEWERS (CURRENT VALUE AND MAXIMUM VALUE) |
| NUMBER OF COMMENTS |
| NUMBER OF LIKES |
| NUMBER OF AUTOMATIC TAG TWEETS |
| ITEM POINT |
| DISTRIBUTION POINT |
| ... |

FIG. 5

INPUT INFORMATION MANAGEMENT TABLE 413

| DISTRIBUTION ID |
| --- |
| TAG ID |
| INPUTTER USER ACCOUNT |
| TAG CONTENT |
| ATTACHED DATE AND TIME (YEAR, MONTH, DATE, HOUR, MINUTE, SECOND) |
| ... |

FIG. 6

POST MANAGEMENT TABLE 414

| DISTRIBUTION ID |
| --- |
| POST ID |
| POST CONTENT |
| POST DATE AND TIME (YEAR, MONTH, DATE, HOUR, MINUTE, SECOND) |
| ... |

FIG. 7

| RATING OF DISTRIBUTION POINT WITHIN RANKING BAND ON PREVIOUS DAY | FLUCTUATION IN RANKING METER VALUE |
|---|---|
| TOP 10% | +2 |
| TOP 11 TO 30% (REMAINING 20% AFTER SUBTRACTING TOP 10% FROM TOP 30%) | +1 |
| MIDDLE 30% | ±0 |
| BOTTOM 40% | -1 |
| *NO DISTRIBUTION THAT DAY | -1 |

FIG. 23

| UPDATE CONTENT OF RANKING | NECESSARY RANKING METER VALUE |
|---|---|
| INCREASE IN RANKING TO ANOTHER RANKING BAND | +4 |
| INCREASE IN RANKING WITHIN SAME RANKING BAND | +2 |
| DECREASE IN RANKING WITHIN SAME RANKING BAND | -2 |
| DECREASE IN RANKING TO ANOTHER RANKING BAND | -6 |

FIG. 24

SYSTEM, METHOD, AND COMPUTER-READABLE MEDIUM INCLUDING PROGRAM FOR PROVIDING LIVE VIDEO DISTRIBUTION SERVICE

CROSS-REFERENCE TO RELATED APPLICATIONS

The present application claims the benefit of Japanese Patent Application No. JP2019-207487, filed on Nov. 15, 2019, the content of which is incorporated herein in its entirety by reference.

TECHNICAL FIELD

The present disclosure relates to a system, a method, and a computer-readable medium including a program for providing a live video distribution service.

BACKGROUND ART

Various live video distribution (live streaming) services for performing live distribution of video have been conventionally provided (for example, see PTL 1 described below). In such a service, typically, a user including an ordinary person can be a distributor (streamer) who performs live distribution of video, and various kinds of video (for example, a video captured through a camera, a video corresponding to a screen of an application such as a game application, or the like) are provided to a viewer.

PTL 1: JP 2019-022219A

SUMMARY

However, in a conventional live video distribution service, a user cannot know a situation and an atmosphere of live distribution without actually viewing a video being distributed, which results in one of factors that inhibit entry of a new viewer.

One of objects of an embodiment of the present disclosure is to promote entry of a new viewer into a live video distribution service. Other objects of the embodiment of the present disclosure will be made apparent with reference to the entire description.

A system according to an embodiment of the present disclosure is a system for providing a live video distribution service, the system including one or a plurality of computer processors, wherein the one or plurality of computer processors execute a machine-readable instruction to perform: distributing a video provided by a distributor to a plurality of viewers; managing input information input by each of the plurality of viewers during distribution of the video; and posting a message related to the video on an SNS by the distributor, and posting the message includes generating the message related to the video at least based on the input information input by each of the plurality of viewers during distribution of the video.

A method according to an embodiment of the present disclosure is a method for providing a live video distribution service being executed by one or a plurality of computers, the method including: distributing a video provided by a distributor to a plurality of viewers; managing input information input by each of the plurality of viewers during distribution of the video; and posting a message related to the video on an SNS by the distributor, wherein posting the message includes generating the message related to the video at least based on the input information input by each of the plurality of viewers during distribution of the video.

A non-transitory computer-readable medium according to an embodiment of the present disclosure is a non-transitory computer-readable medium including a program for providing a live video distribution service, wherein the program causes one or a plurality of computers to execute: distributing a video provided by a distributor to a plurality of viewers; managing input information input by each of the plurality of viewers during distribution of the video; and posting a message related to the video on an SNS by the distributor, and posting the message includes generating the message related to the video at least based on the input information input by each of the plurality of viewers during distribution of the video.

Various embodiments of the present disclosure may promote entry of a new viewer into a live video distribution service.

BRIEF DESCRIPTION OF DRAWINGS

FIG. 3 is a diagram illustrating information managed in a user information table 411.

FIG. 4 is a diagram illustrating rankings.

FIG. 5 is a diagram illustrating information managed in a distribution management table 412.

FIG. 6 is a diagram illustrating information managed in an input information management table 413.

FIG. 7 is a diagram illustrating information managed in a post management table 414.

FIG. 23 is a diagram illustrating an update rule for a ranking meter value.

FIG. 24 is a diagram illustrating a correspondence relationship between an update content of a ranking and a necessary ranking meter value.

DETAILED DESCRIPTION

Embodiments of the present disclosure will be described below with reference to the drawings.

Figure 1:
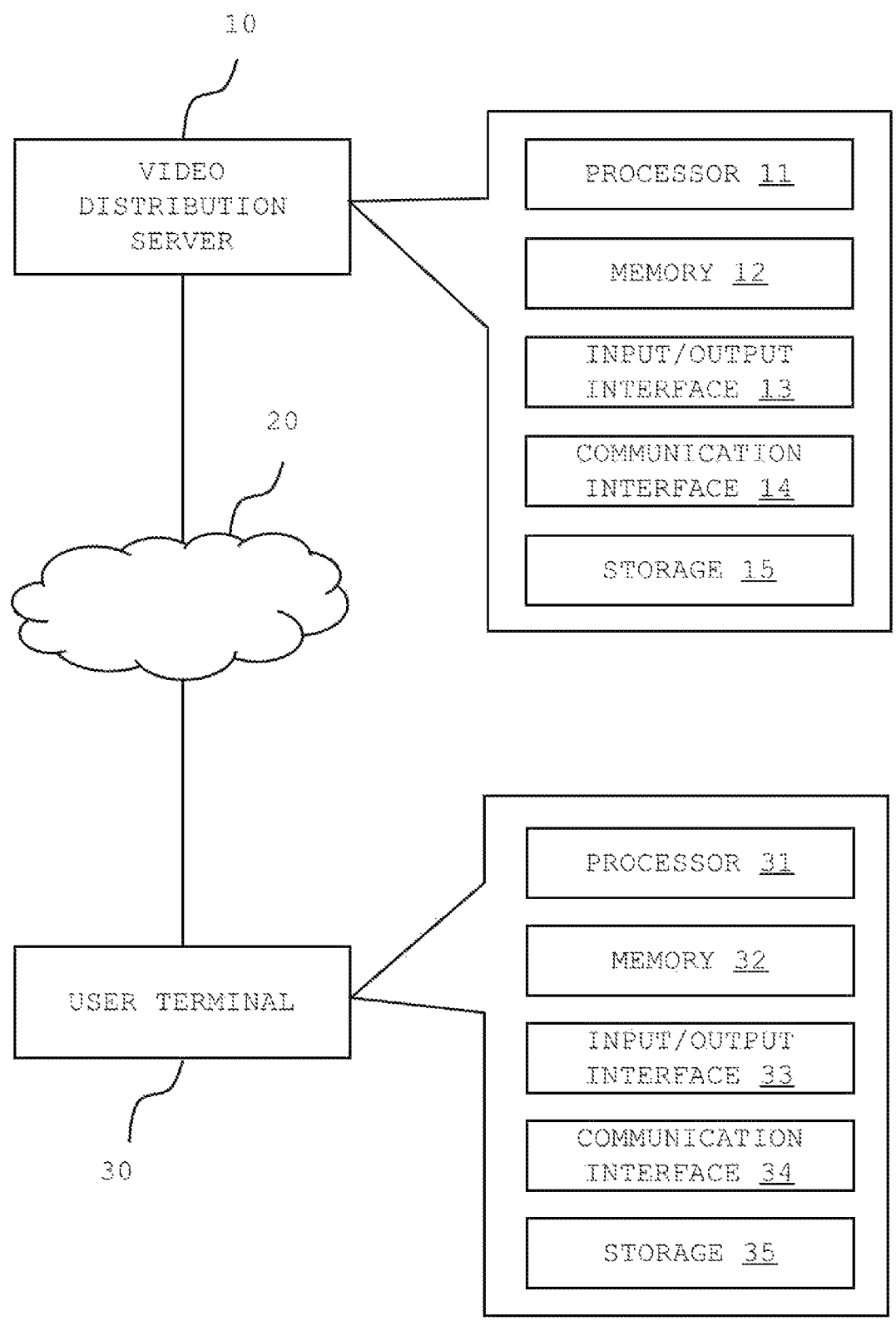
FIG. 1 is a configuration diagram schematically illustrating a configuration of a network including a video distribution server 10 according to an embodiment of the present disclosure.

FIG. 1 is a configuration diagram schematically illustrating a configuration of a network including a video distribution server 10 according to an embodiment of the present disclosure. As illustrated, the video distribution server 10 is communicably connected to a user terminal 30 via a communication network 20 such as the Internet. Only one user terminal 30 is illustrated in FIG. 1, but the server 10 is communicably connected to a plurality of user terminals 30. The server 10 provides a user with a live video distribution (live streaming) service for distributing and viewing a video in real time via the user terminal 30. In the present embodiment, the user who operates the user terminal 30 can be a distributor (streamer) who distributes a video and can also be a viewer who views a video provided by another user. The video distribution server 10 is an example of a device in which all or a part of a system of the present disclosure is installed.

The video distribution server 10 is configured as a typical computer and, as illustrated in FIG. 1, the video distribution server 10 includes a computer processor 11, a main memory 12, an input/output interface 13, a communication interface 14, and a storage 15, with these components being electrically connected via a bus (not illustrated) or the like.

The computer processor 11 is configured as a CPU, a GPU, or the like, reads various programs that are stored in the storage 15 or the like into the main memory 12, and executes various kinds of commands (instructions) included in the programs. The main memory 12 is constituted with a DRAM or the like, for example.

The input/output interface 13 includes various kinds of input/output devices for transmitting and receiving information with a user or the like. The input/output interface 13 includes, for example, an information input device such as a keyboard and a pointing device (for example, a mouse, a touch panel, and the like), voice input devices such as a microphone, and an image input device such as a camera. The input/output interface 13 includes an image output device such as a display, and a voice output device such as a speaker.

The communication interface 14 is installed as hardware such as a network adapter, various kinds of communication software, or combinations thereof, and is configured to achieve wired or wireless communication via the communication network 20 or the like.

The storage 15 is constituted with a magnetic disk, a flash memory, or the like, for example. The storage 15 stores various kinds of programs including an operating system, various kinds of data, and the like.

In the present embodiment, the video distribution server 10 can be configured by using a plurality of computers each having the hardware configuration described above. For example, the video distribution server 10 can be constituted with one or a plurality of server devices.

The video distribution server 10 configured in such a manner can be configured to function as a web server and an application server, and, in this case, the video distribution server 10 executes various kinds of processing in response to a request from a web browser and other applications (such as applications for a live video distribution service) installed on the user terminal 30, and transmits, to the user terminal 30, screen data (such as HTML data), control data, and the like according to a result of the processing. The user terminal 30 can display a web page or another screen based on the received data.

The user terminal 30 is configured as a typical computer and, as illustrated in FIG. 1, the user terminal 30 includes a computer processor 31, a main memory 32, an input/output interface 33, a communication interface 34, and a storage 35, with these components being electrically connected via a bus (not illustrated) or the like.

The computer processor 31 is configured as a CPU, a GPU, or the like, reads various programs that are stored in the storage 35 or the like into the main memory 32, and executes various kinds of commands included in the programs. The main memory 32 is constituted with a DRAM or the like, for example.

The input/output interface 33 includes various kinds of input/output devices for exchanging information with a user or the like. The input/output interface 33 includes, for example, an information input device such as a keyboard and a pointing device (for example, a mouse, a touch panel, and the like), voice input devices such as a microphone, and an image input device such as a camera. The input/output interface 33 includes an image output device such as a display and a voice output device such as a speaker.

The communication interface 34 is installed as hardware such as a network adapter, various kinds of communication software, or combinations thereof, and is configured to achieve wired or wireless communication via the communication network 20 or the like.

The storage 35 is constituted with a magnetic disk, a flash memory, or the like, for example. The storage 35 stores various kinds of programs including an operating system, various kinds of data, and the like. The programs stored in the storage 35 can be downloaded from an application market or the like and installed.

In the present embodiment, the user terminal 30 can be configured as a smartphone, a tablet terminal, a personal computer, a wearable device, and the like.

The user who operates the user terminal 30 configured in such a manner can use the live video distribution service provided by the video distribution server 10 by executing communication with the video distribution server 10 via a web browser or another application installed in the storage 35 or the like.

Figure 2:
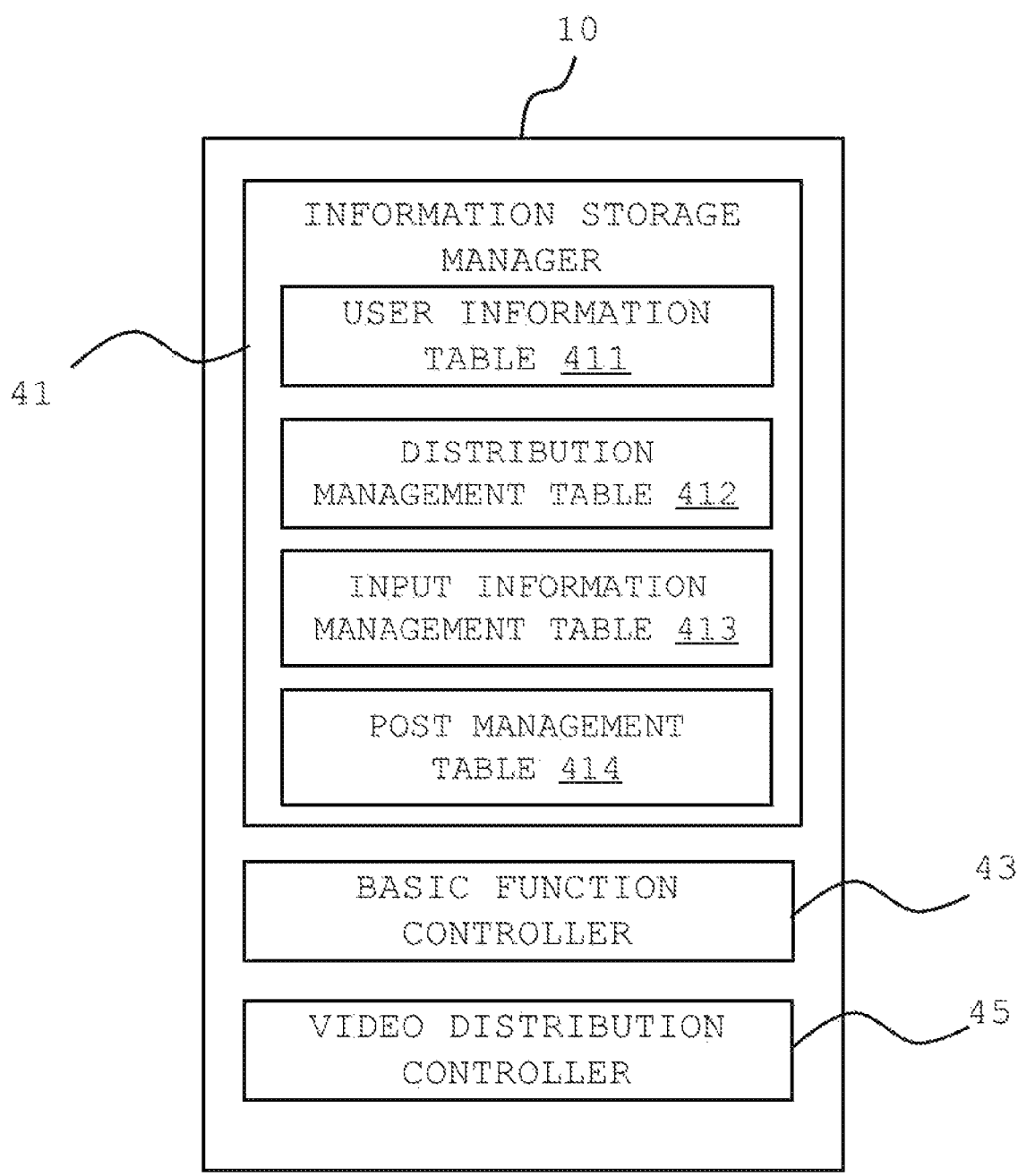
FIG. 2 is a block diagram schematically illustrating functions of the video distribution server 10.

Next, functions of the video distribution server 10 in the present embodiment will be described. FIG. 2 is a block diagram schematically illustrating functions of the video distribution server 10. As illustrated, the server 10 includes an information storage manager 41 that stores and manages various kinds of information, a basic function controller 43 that controls basic functions of a live video distribution service, and a video distribution controller 45 that controls distribution of video. The functions are realized by hardware such as the computer processor 11 and the main memory 12, and various kinds of programs, data, and the like stored in the storage 15 and the like, operating in cooperation with each other. For example, the functions are realized by the computer processor 11 executing a command included in a program read into the main memory 12. Further, some or all of the functions of the server 10 illustrated in FIG. 2 can be realized by cooperation between the server 10 and the user terminal 30, or can be realized by the user terminal 30.

The information storage manager 41 stores and manages various kinds of information in the storage 15 and the like. For example, as illustrated in FIG. 2, the information storage manager 41 is configured to include a user information table 411 for managing information related to a user of the live video distribution service, a distribution management table 412 for managing information related to individual distribution of video (streaming), an input information management table 413 for managing input information input by a viewer of video, and a post management table 414 for managing a post of a message related to a video on an SNS.

The basic function controller 43 executes various kinds of processing related to the control of the basic functions of the live video distribution service. For example, the basic function controller 43 transmits screen data, control data, and the like of various kinds of screens related to the basic function to the user terminal 30, executes various kinds of processing in response to an operation input by the user via the screen displayed on the user terminal 30, and transmits the screen data, the control data, and the like according to a result of the processing to the user terminal 30. The basic functions controlled by the basic function controller 43 include, for example, login processing (user authentication), fee charging control, user management (for example, updating of the user information table 411, and the like), and the like.

The video distribution controller 45 executes various kinds of processing related to the control of distribution of a video. For example, the video distribution controller 45 is configured to distribute a video provided by a distributor to a plurality of viewers. For example, the video distribution controller 45 is configured to receive real-time video transmitted from the user terminal 30 of a distributor (hereinafter may be referred to as a "distributor terminal 30"), and transmit the video to the user terminal 30 of each of a plurality of viewers (hereinafter may be referred to as a "viewer terminal 30"). The video is formed of, for example, an image input through a camera of the distributor terminal 30 and voice input through a microphone of the distributor terminal 30. Further, the video is formed of, for example, an image and voice output through an application (such as a game application, for example) being executed on the distributor terminal 30. The distribution of such video can be performed by, for example, a streaming method using a protocol such as HTTP Live Streaming (HLS).

In the present embodiment, the video distribution controller 45 is configured to manage input information input by a viewer during distribution of video. For example, the video distribution controller 45 is configured to receive input information input by a viewer of a specific video via the viewer terminal 30, and also transmit the input information to the distributor terminal 30 of a distributor of the specific video and the viewer terminal 30 of another viewer of the specific video. For example, the input information is managed in the input information management table 413.

Further, the video distribution controller 45 is configured to post a message related to a video on an SNS by a distributor. The SNS includes, for example, various kinds of SNSs outside a live video distribution service, such as Twitter, Instagram, and Facebook, although not limited thereto. For example, the video distribution controller 45 is configured to post a message by using an account of a distributor in such an SNS (managed in the user information table 411, for example). Such a post of a message may be achieved by using an API provided by a corresponding SNS.

In the present embodiment, a message posted on the SNS is generated at least based on input information input by a viewer. In other words, the video distribution controller 45 is configured to generate a message related to a video at least based on input information by a viewer during distribution of the video.

In this way, the video distribution server 10 in the present embodiment generates a message based on input information by a viewer during distribution of the video, and posts the message on the SNS by a distributor of the video, and thus allows a user of the SNS to know a situation and an atmosphere of live distribution in the video distribution service. As a result, entry of a new viewer into the live video distribution service may be promoted.

In the present embodiment, the video distribution controller 45 may be configured to generate a message for posting on the SNS so that a plurality of pieces of input information are arranged in the message according to an input order and/or so that a plurality of pieces of input information each being associated with a corresponding input time are included in the message. Such a configuration allows a user of the SNS to know a situation and an atmosphere of live distribution via a message including pieces of input information according to an input order and/or information associated with an input time.

In the present embodiment, a post on the SNS may be written at various timings. For example, the video distribution controller 45 may be configured to post on the SNS in response to an individual instruction from a distributor.

Further, a post on the SNS may be automatically (without an individual instruction from a distributor) executed. In other words, the video distribution controller 45 may be configured to automatically post on the SNS in response to a predetermined condition being satisfied. The predetermined condition includes various conditions. For example, the video distribution controller 45 is configured to automatically post on the SNS at a predetermined time interval, and, in this case, the predetermined time interval may be a fixed value or a variable value (for example, the more input information input from viewers, the shorter time interval, and the like). Such a configuration may reduce a load on a distributor related to a post on the SNS and also promote posting on the SNS at an appropriate timing.

Further, the video distribution controller 45 may be configured to exclude input information input within a predetermined time period (from the predetermined time period ago to a present time) when generating a message for posting on the SNS (i.e., generate a message based on input information input by the predetermined time period ago). Such a configuration can exclude latest input information to generate a message, and may thus, for example, inhibit a post of an inappropriate message on the SNS based on inappropriate input information.

Further, the video distribution controller 45 may be configured to post a first message related to a specific video, and then post a second message related to the specific video so that the second message is associated with the first message. In the SNS, such a post of a message associated with a preceding message may be referred to as a reply to the preceding message. Such a configuration can post, in association with each other, a plurality of messages related to the same video, and may, for example, prevent a plurality of posts being scattered in the SNS.

Further, the video distribution controller 45 may be configured to give, in response to a post of a message related to a video on the SNS, a reward to a distributor who is a contributor of the post. The reward includes, but is not limited to, an electronic and virtual item, point, and the like being usable in a live video distribution service, for example. Such a configuration promotes a post on the SNS by a distributor.

In the present embodiment, input information input by a viewer includes various kinds of information that may be input during distribution of a video. The input information includes, but is not limited to, an item, a comment, a like, a tag, and the like, for example. The tag is typically configured as information including a character string and is associated with a video being distributed. Then, the video distribution controller 45 may be configured to present information related to a video being distributed to a user at least based on an associated tag. For example, the information related to a video being distributed may be configured to include information related to a tag associated with the video or information being processed based on the tag. Further, for example, the information related to a video being distributed may be configured as a list of videos that are extracted based on an associated tag or that are arranged based on the tag. Such a configuration allows a post of a message based on an item, a comment, a like, a tag, and the like input by a viewer, on the SNS.

Next, a specific example of the video distribution server 10 in the present embodiment having such a function will be described. A live video distribution service in this example is configured as a service in which a video formed of an image input through the camera of the distributor terminal 30 and voice input through the microphone of the distributor terminal 30 can be distributed live and viewed.

In this example, FIG. 3 illustrates information managed in the user information table 411. The user information table 411 manages information related to a user of the live video distribution service and, as illustrated, the user information table 411 manages, in association with "user account" that identifies an individual user, information such as "basic information" including an account name, age, gender, and the like, "distribution history information" that is information related to distribution history of video, "viewing history information" that is information related to viewing history of video distributed by another user, "following user information" that is information related to another user followed by the user, "follower information" that is information related to another user (follower) who follows the user, "family information" that is information related to a family in which the user joins as a family member, "ranking" that indicates a ranking of a user as a distributor, "ranking meter value" that is a parameter value for determining whether to increase or decrease a ranking, "number of held coins" that indicates how many virtual coins are held in the live video distribution service, "number of held diamonds" that similarly indicates how many virtual diamonds are held, "tag point information" that is information related to a tag point increasing according to an input of a tag as a viewer, "tag information" that is information related to a tag input by a viewer while the user distributes a video as a distributor, and "classification text" that is a classification set by the user as a distributor. In this example, the family is a community of a fan who supports a distributor. The family can be joined according to an invitation from a distributor or family manager and can also be joined according to approval by the distributor or family manager to an application for admission by a user.

FIG. 4 is a diagram illustrating "ranking" of a distributor in this example. As illustrated, in this example, there are six ranking bands of "S", "A", "B", "C", "D", and "E", and each of the five ranking bands of "S", "A", "B", "C", and "D" is formed of three rankings (for example, a ranking in which "+" is added to a letter indicating a ranking band, a ranking with just the letter, and a ranking in which "−" is added to the letter, such as "S+", "S", and "S−"). The ranking band of "E" is formed of one ranking "E". In other words, in this example, there are 16 levels (3×5+1=16) of rankings.

Further, among the ranking bands, the "S" side is the highest and the "E" side is the lowest. Further, among the rankings in the same ranking band, the "+" side is the highest and the "−" side is the lowest. In this example, a ranking of a user is set to "D−" as an initial value.

In this example, FIG. 5 illustrates information managed in the distribution management table 412. The distribution management table 412 manages information related to individual distribution of video, and, as illustrated, the distribution management table 412 manages, in association with "distribution ID" that identifies individual distribution (video), information such as "distributor user account" that identifies a distributor, "distribution date and time", "distribution duration" that indicates a continuous duration of the distribution, "number of viewers (current value and maximum value)", "number of comments" that is the number of comments input by viewers, "number of likes" that is the number of "likes" input by viewers, "number of automatic tag tweets" that is the number of automatic tag tweets tweeted by a distributor in relation to the distribution (video), "item point" that increases according to an input of an item by viewers, and "distribution point" that is a point given to the distribution. The automatic tag tweet will be described below in detail and is one of posts (tweets) on the SNS automatically written with a distributor serving as a post source (contributor).

In this example, FIG. 6 illustrates information managed in the input information management table 413. The input information management table 413 manages information related to a tag associated with a video, and, as illustrated, the input information management table 413 manages, in association with a combination of "distribution ID" that identifies individual distribution and "tag ID" that identifies an individual tag in the distribution (video), information such as "inputter user account" that is a user account of a viewer (tag inputter) who inputs a tag, "tag content" that is a content (character string) of a tag, and "attached date and time (year, month, date, hour, minute, second)" that is date and time at which a tag is attached.

In this example, FIG. 7 illustrates information managed in the post management table 414. The post management table 414 manages information related to a post (tweet) on the SNS by a distributor, and, as illustrated, the post management table 414 manages, in association with a combination of "distribution ID" that identifies individual distribution and "post ID" that identifies an individual post in the distribution (video), information such as "post content" that is a content of a posted message, and "post date and time (year, month, date, hour, minute, second)" that is date and time at which a message is posted.

Figure 8:
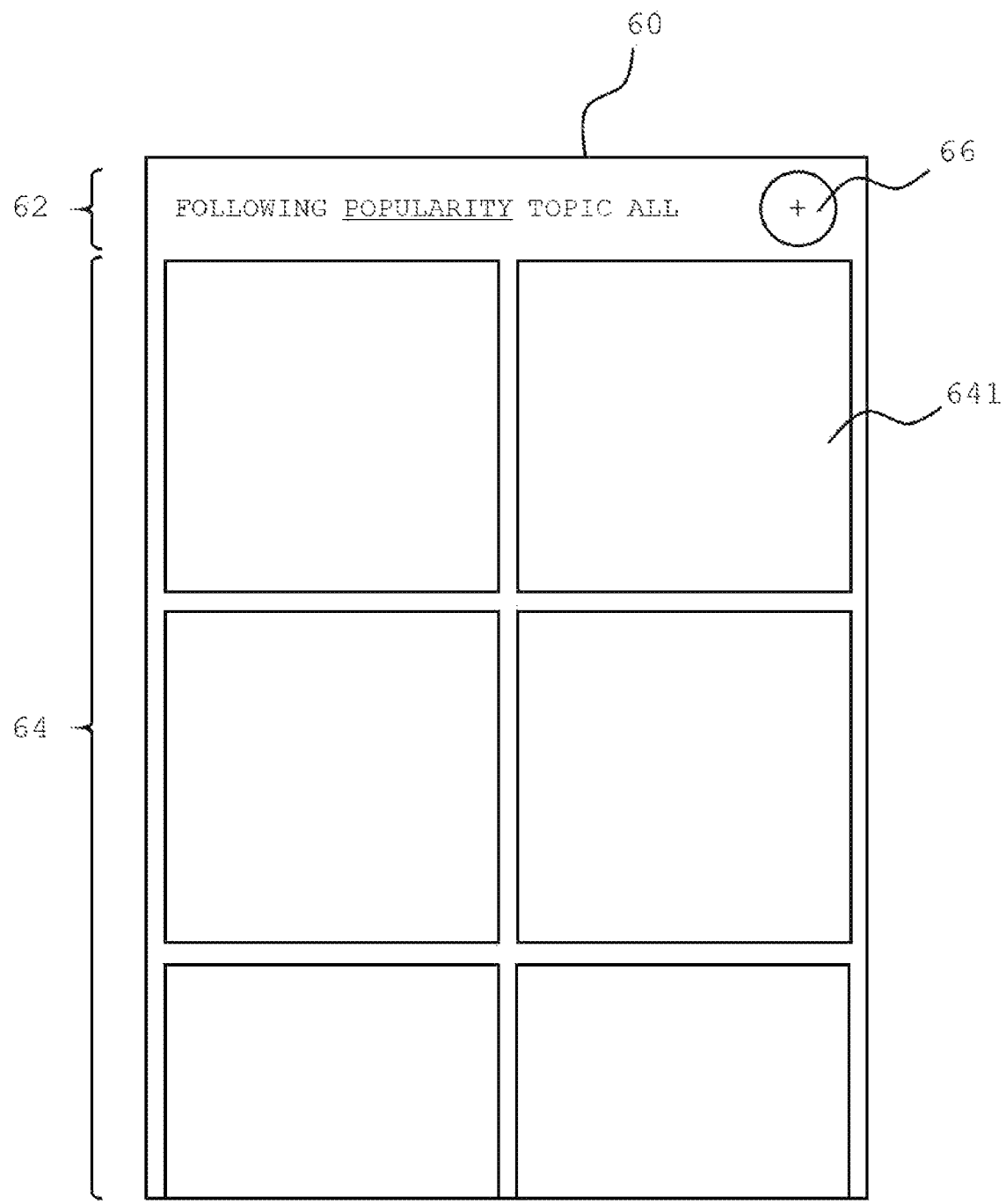
FIG. 8 is a diagram illustrating a top screen 60.

FIG. 8 illustrates a top screen 60 of a live video distribution service displayed on the user terminal 30. The screen 60 is a screen as a start for a user who uses the live video distribution service, and, as illustrated, the screen 60 includes a selection area 62 in which "following", "popular", "topic", and "all" are displayed, a list display area 64 that is located below the area 62, and a distribution button 66 that is located at an upper right corner of the screen and has a circular shape.

The selection area 62 is an area for selecting a content displayed in the list display area 64. Specifically, when "following" is selected in the selection area 62, videos being distributed (live distributions) of another user followed by a user are displayed in a list in the list display area 64. Similarly, when "popular" is selected in the selection area 62, videos extracted according to a predetermined extraction condition for extracting popular videos (for example, videos having the number of viewers (current value) equal to or more than a threshold value, and the like) are displayed in a list in the list display area 64. Further, when "topic" is selected in the selection area 62, tags attached to a video (live distribution) are chronologically displayed in a list together with corresponding videos in the list display area 64, which will be described below in detail. Further, when "all" is selected in the selection area 62, all videos being distributed are displayed in a list in the list display area 64.

The top screen 60 in FIG. 8 corresponds to a case where "popular" is selected in the selection area 62. As illustrated, in the list display area 64 in this case, a plurality of individual display areas 641 each displaying information related to an individual video are arranged in two columns. The individual display area 641 is configured to be able to make a user start viewing of a corresponding video in response to a selection by the user. The list display area 64 is configured such that the individual display area 641 to be displayed is switched by a flicking or sliding operation in the up-down direction, and the like. The configuration of the list display area 64 when "following" or "all" is selected in the selection area 62 is similar to the above-described configuration when "popular" is selected. Note that the configuration of the list display area 64 when "topic" is selected in the selection area 62 will be described below.

Figure 9:
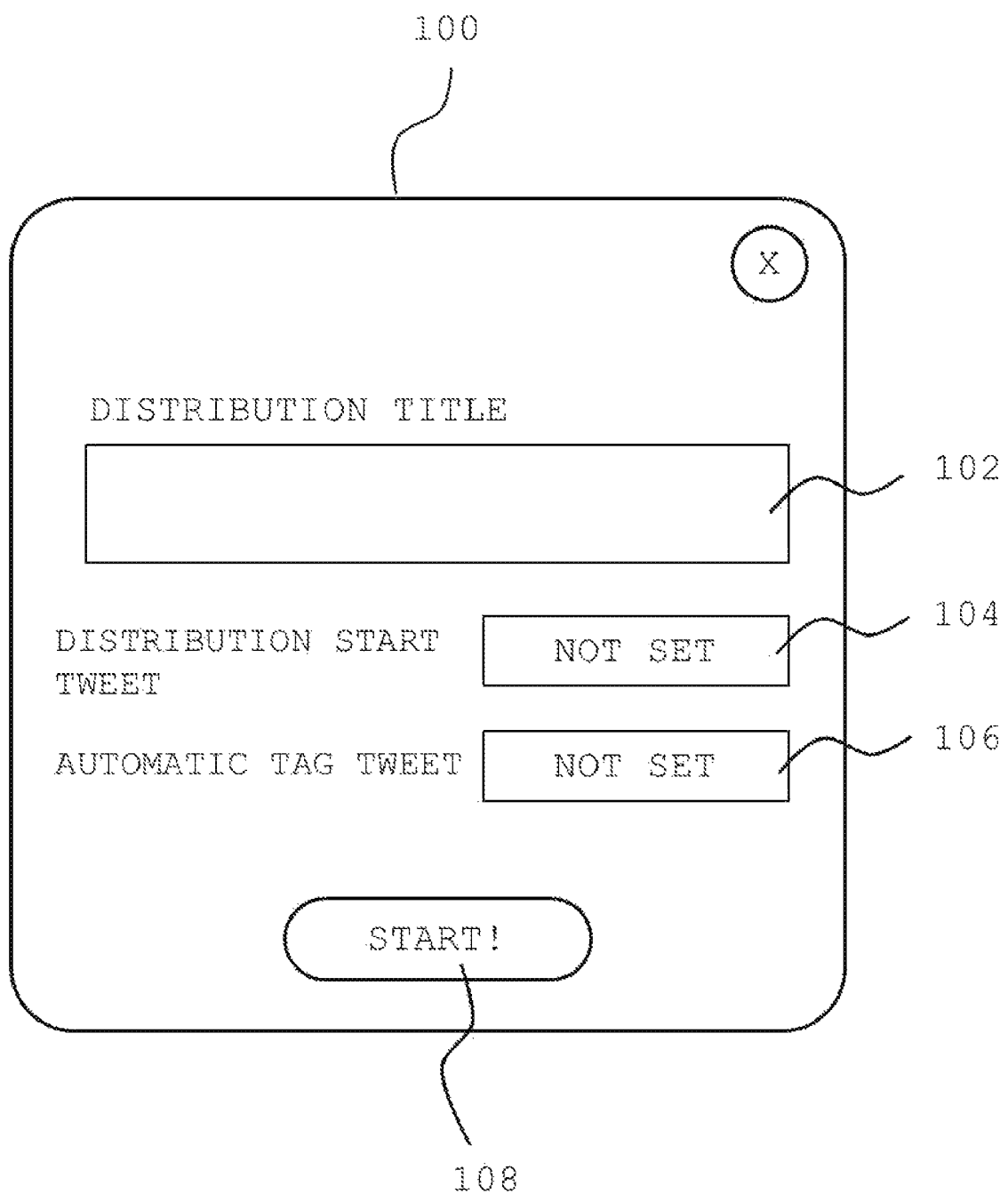
FIG. 9 is a diagram illustrating a distribution preparation screen 100.

The distribution button 66 is an object for the user as a distributor to perform live distribution of video (live streaming). When the distribution button 66 is selected by the user, a distribution preparation screen 100 illustrated in FIG. 9 is displayed over the top screen 60. As illustrated, the screen 100 includes a distribution title input area 102 for inputting a distribution title, a distribution start tweet setting button 104 for performing setting related to a distribution start tweet, an automatic tag tweet setting button 106 for performing setting related to an automatic tag tweet, and a distribution start button 108 with "start!" displayed.

In this example, the distribution start tweet is a tweet automatically posted in response to a start of live distribution of video and is a tweet in which a distributor serves as a post source (contributor). When the distribution start tweet setting button 104 is selected, a screen for selecting an SNS account of a distributor used when the distributor posts a distribution start tweet is displayed, and the distributor can set the SNS account for tweeting the distribution start tweet via the screen. Note that, when an SNS account for a distribution start tweet is not set, the distribution start tweet is not posted (regarded as an OFF state).

Further, in this example, the automatic tag tweet is a tweet automatically posted based on a tag input by a viewer and is a tweet in which a distributor serves as a post source (contributor), which will be described below in detail. When the automatic tag tweet setting button 106 is selected, a screen for selecting an SNS account of a distributor used when the distributor posts an automatic tag tweet is displayed, and the distributor can set the SNS account for tweeting the automatic tag tweet via the screen. Note that, when an SNS account for an automatic tag tweet is not set, the automatic tag tweet is not posted (regarded as an OFF state).

In this example, the distributor can set the same SNS account or can alternatively set SNS accounts different from each other as the SNS account for a distribution start tweet and the SNS account for an automatic tag tweet. Further, when setting of the SNS accounts is performed, a new SNS account may be able to be created.

When the distribution start button 108 is selected, live distribution of video (live streaming) starts, and specifically, transmission to the server 10 of video formed of an image input through the camera of the user terminal 30 and voice input through the microphone of the user terminal 30 starts. Further, a new record is created in the distribution management table 412 in response to the start of the live distribution.

Figure 10:
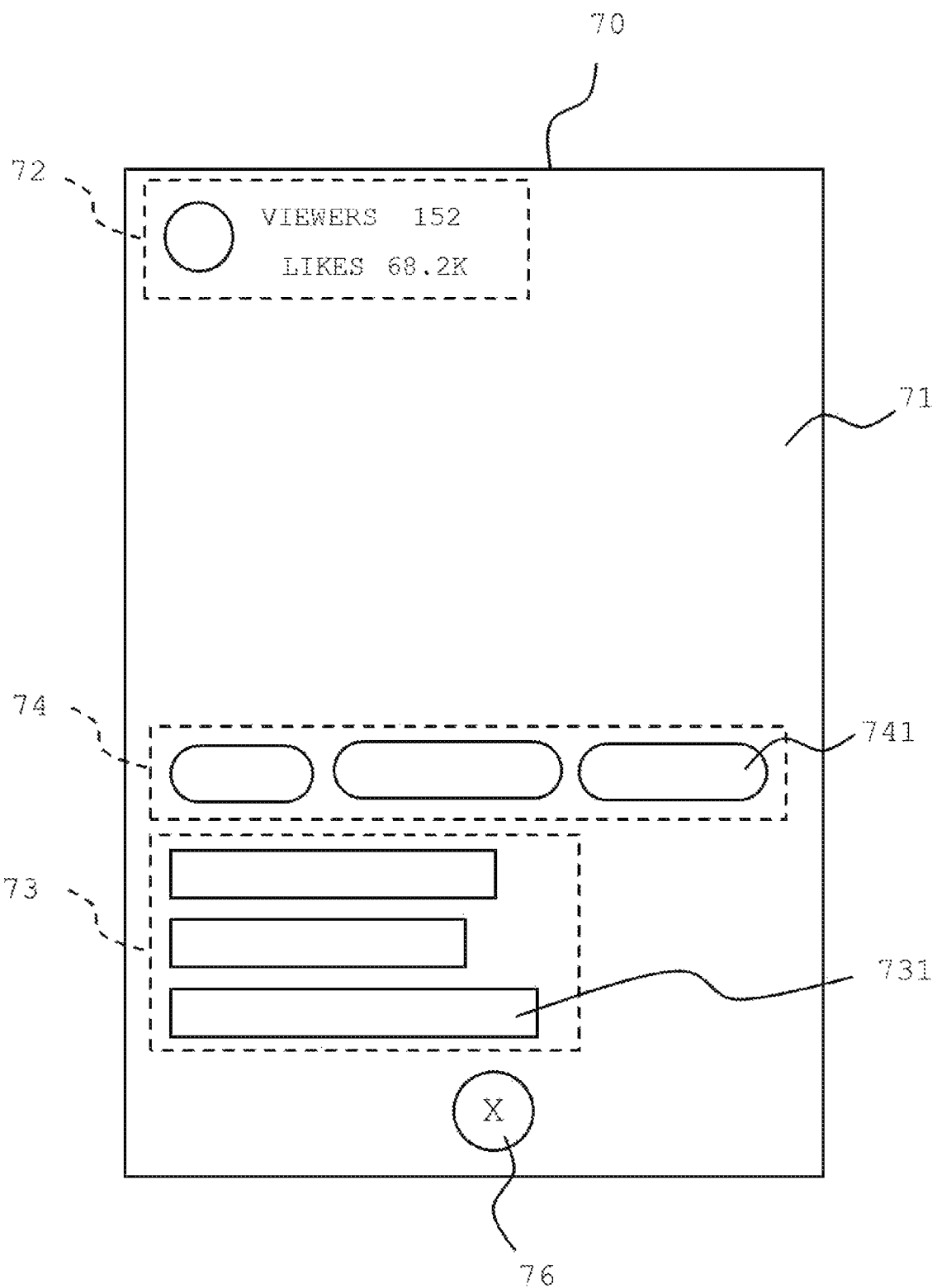
FIG. 10 is a diagram illustrating a distribution screen 70.

FIG. 10 illustrates a distribution screen 70 displayed on the distributor terminal 30 in response to a selection of the distribution start button 108 (i.e., a start of live distribution of video). As illustrated, the screen 70 includes a video display area 71 corresponding to the entire screen, a basic information display area 72 located at an upper left corner of the screen, a comment display area 73 located at the lower left of the screen, a tag display area 74 located above the area 73, and a distribution stop button 76 that is located at the center of a lower end portion of the screen and has a circular shape.

A video to be distributed live, i.e., an image input through the camera of the distributor terminal 30, is displayed in the video display area 71. A distributor normally makes the distributor himself/herself a subject of the video through an in-camera (front camera) of the distributor terminal 30, and thus an image of the distributor himself/herself is included in a video to be distributed.

The basic information display area 72 displays basic information of the distribution, and specifically, displays distributor information (such as a profile image), the number of viewers (current value) of the distribution, the number of "likes" input by viewers for the distribution, and the like.

The comment display area 73 is an area for displaying a user comment input by a viewer or a system comment being automatically input by the server 10. Specifically, a plurality of comment objects 731 each corresponding to an individual comment are arranged in the up-down direction in the area 73. The comment display area 73 is configured such that, when a new comment is input, a corresponding comment object 731 is added to the lower side, and an existing comment object 731 sequentially moves upward. The comment display area 73 is configured such that the comment object 731 to be displayed is switched by a flicking or sliding operation in the up-down direction, and the like.

The tag display area 74 displays information related to a tag attached to the distribution (video). Specifically, a plurality of tag objects 741 each corresponding to an individual tag are arranged in the left-right direction in the area 74. Details of the tag display area 74 will be described below.

The distribution stop button 76 is an object for the distributor to stop live distribution of video. When the distribution stop button 76 is selected by the distributor, the live distribution of the video (transmission of the video from the distributor terminal 30 to the server 10) is stopped.

Figure 11:
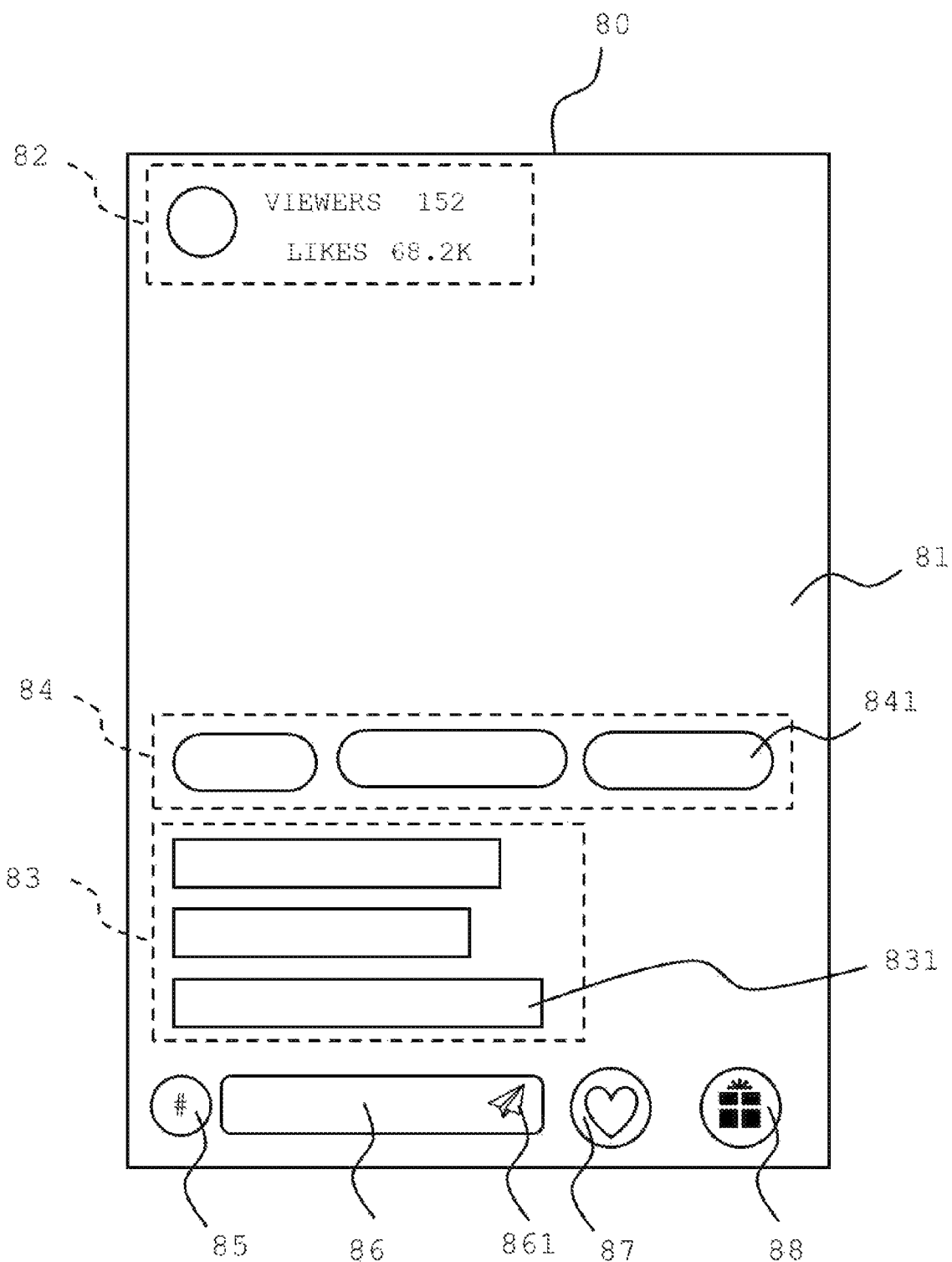
FIG. 11 is a diagram illustrating a viewing screen 80.

FIG. 11 illustrates a viewing screen 80 displayed on the viewer terminal 30. For example, when any video is selected by a viewer through the list display area 64 of the top screen 60 and the like, the viewing screen 80 for viewing the selected video (live distribution) is displayed on the viewer terminal 30. As illustrated, the screen 80 includes a video display area 81, a basic information display area 82, a comment display area 83, and a tag display area 84, similarly to the distribution screen 70 described above. Further, the viewing screen 80 includes, in a lower end portion of the screen, an input mode switching button 85, a comment input area 86, a "like" button 87 with a heart mark displayed, and an item input button 88 with a symbol of a gift displayed.

The comment input area 86 is an area for the viewer to input a comment. A transmission object 861 is disposed in a right end portion of the area 86. When the object 861 is selected, a character string input in the comment input area 86 is transmitted as a user comment. In the corresponding distributor terminal 30 (distributor terminal 30 of a distributor of a corresponding video) and each viewer terminal 30 (viewer terminal 30 of each of a plurality of viewers of a corresponding video), the comment object 731 and a comment object 831 corresponding to the user comment can be displayed in the comment display areas 73 and 83 of the distribution screen 70 and the viewing screen 80. In the comment objects 731 and 831 corresponding to the user comment, a content of the comment (character string) is displayed together with an account name of the viewer who inputs the comment. Further, when the user comment is transmitted, the server 10 updates the "number of comments" (adds 1) in the distribution management table 412.

The like button 87 is an object for a viewer to input "like" to a distributor (or a distribution by the distributor). When the button 87 is selected by a viewer, an input of "like" is performed. In the corresponding distributor terminal 30 and each viewer terminal 30, the comment objects 731 and 831 corresponding to a system comment that notifies the input of "like" can be displayed in the comment display areas 73 and 83 of the distribution screen 70 and the viewing screen 80. In the comment objects 731 and 831 corresponding to the system comment, text indicating the input of "like" is displayed together with an account name of the viewer who inputs "like". Further, when "like" is input, a predetermined visual effect (for example, an animation effect in which a heart-shaped object is displayed as flowing from a lower side toward an upper side of the screen, and the like) is added in the video display areas 71 and 81 of the distribution screen 70 and the viewing screen 80. Further, when "like" is input, the server 10 updates the "number of likes" (adds 1) in the distribution management table 412.

Figure 12:
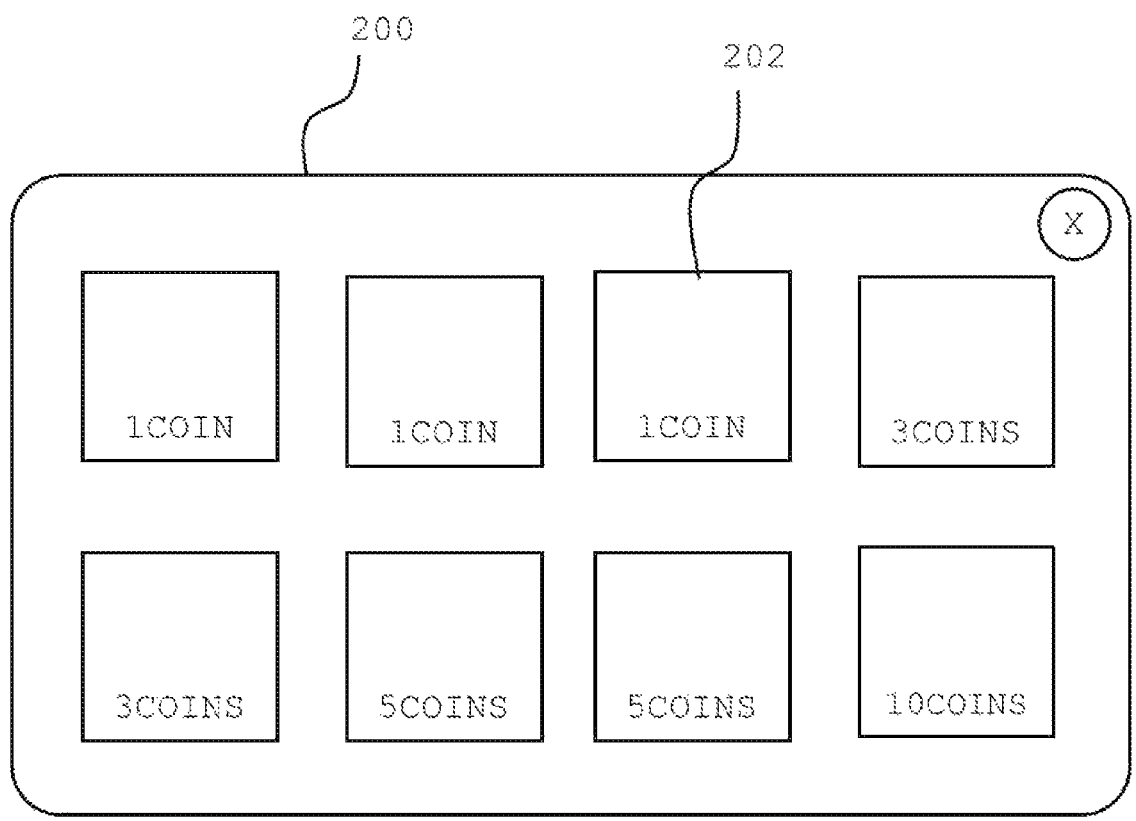
FIG. 12 is a diagram illustrating an item selection screen 200.

The item input button 88 is an object for a viewer to input an item. When the button 88 is selected by a viewer, an item selection screen 200 illustrated in FIG. 12 is displayed over the viewing screen 80. As illustrated, the screen 200 displays a list of a plurality of individual display areas 202 each displaying information related to an item. The individual display area 202 displays an image corresponding to an item and the number of coins required to input the item.

In this example, a plurality of items that can be input by a viewer are predetermined, and the number of coins as a price (value, compensation) of each of the items is preset to the item. The item selection screen 200 displays a list of the plurality of items that can be input. When any of the items is selected by the viewer through the item selection screen 200, the selected item is input.

When the item is input, in the corresponding distributor terminal 30 and each viewer terminal 30, the comment objects 731 and 831 corresponding to a system comment that notifies the input of the item can be displayed in the comment display areas 73 and 83 of the distribution screen 70 and the viewing screen 80. In the comment objects 731 and 831 corresponding to the system comment, a name of the input item is displayed together with an account name of the viewer who inputs the item. Further, when the item is input, a visual effect corresponding to the input item is added in the video display areas 71 and 81 of the distribution screen 70 and the viewing screen 80. Further, when the item is input, the server 10 gives an item point according to the number of coins of the input item (for example, a point also increases as the number of coins increases) to the distribution, and specifically, adds a point according to the number of coins to the "item point" of the corresponding distribution in the distribution management table 412. Further, when the item is input, the server 10 subtracts the number of coins of the input item from the "number of held coins" of the corresponding user (the viewer who inputs the item) in the user information table 411.

Herein, an operation related to attaching a tag to a video (live distribution) in this example will be described. The input mode switching button 85 of the viewing screen 80 is an object for performing an input of a tag via the comment input area 86. While the input mode switching button 85 is in a non-selected state, the comment input area 86 is in a normal comment input mode, and, as described above, a character string input in the comment input area 86 is transmitted as a user comment in response to a selection of the transmission object 861. On the other hand, when the input mode switching button 85 is in a selected state, the comment input area 86 is in a tag input mode, and a character string input in the comment input area 86 is transmitted as a tag in response to a selection of the transmission object 861.

In this example, a viewer who can input a tag is limited to a family member of a distributor of a video to be tagged (i.e., video being viewed). Specifically, the input mode switching button 85 of the viewing screen 80 can be selected (is effective) when the viewer is the family member of the distributor, while the input mode switching button 85 cannot be selected (is ineffective) when the viewer is not the family member of the distributor.

Figure 13:
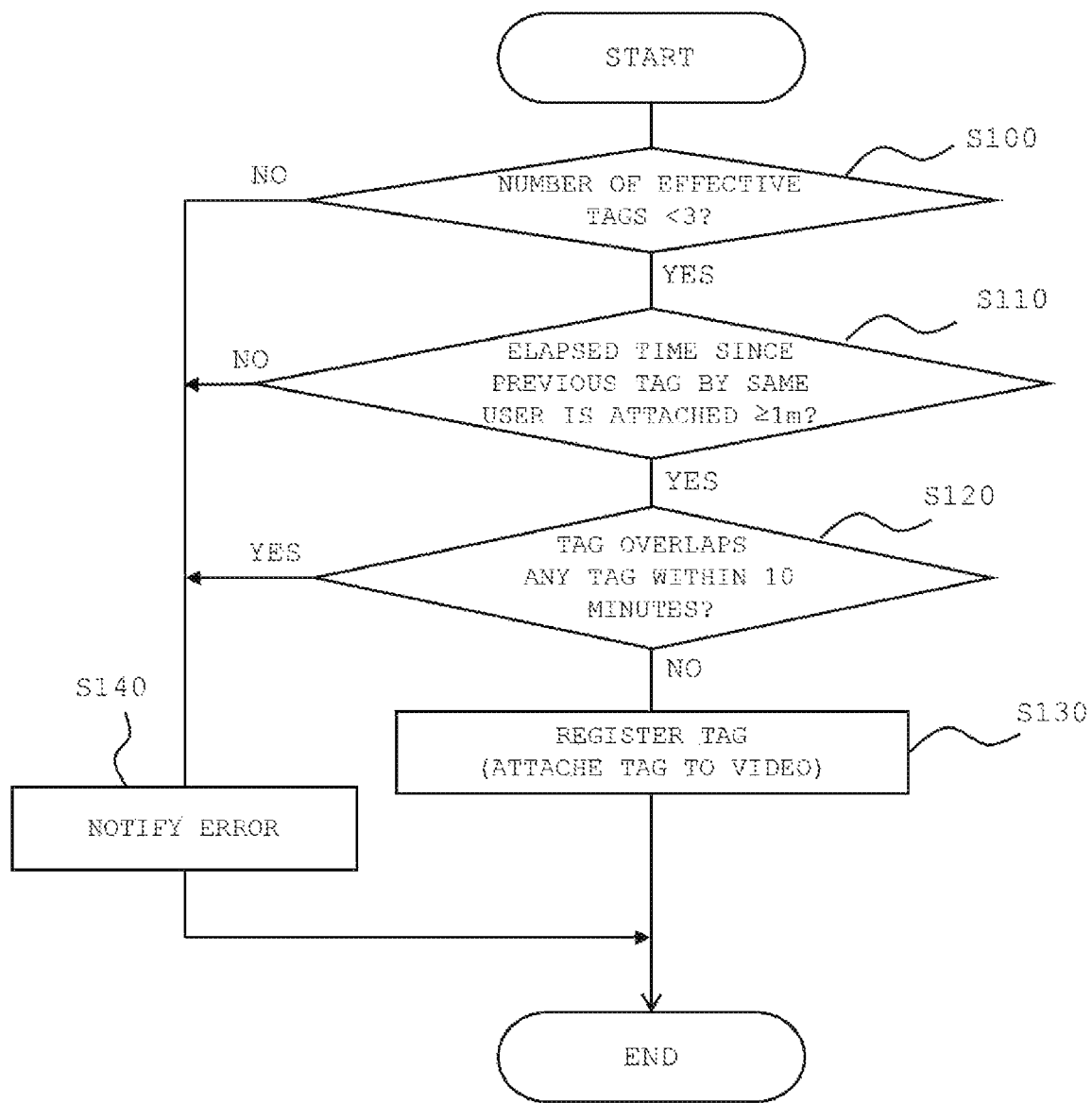
FIG. 13 is a flowchart illustrating processing executed by the server 10 in response to an input of a tag.

FIG. 13 is a flowchart illustrating processing executed by the server 10 in response to an input (transmission) of a tag by any viewer. When a tag is input, as illustrated, the server 10 first checks whether the number of currently effective tags (that are effective at that point in time) in a target video (live distribution) is less than three (i.e., equal to or less than two) (step S100). In this example, a tag attached to the video is managed as a tag in a currently effective state (a fresh tag) before a lapse of five minutes since the tag is attached. In other words, in this example, it can be said that the "number of currently effective tags" is the number of tags attached from five minutes ago to a present time. The currently effective tag is specified by referring to the "attached date and time" in the input information management table 413.

Then, when the number of currently effective tags is less than three (YES in step S100), next, the server 10 checks whether one minute or longer has elapsed after a previous tag by the same user is attached to the target video (step S110). An attached time of the previous tag by the same user is specified by referring to the "inputter user account" and the "attached date and time" in the input information management table 413.

Then, when one minute or longer has elapsed after the previous tag by the same user is attached (YES in step S110), next, the server 10 checks whether a content of the tag (character string) does not overlap another tag attached within 10 minutes to the target video (step S120). The content of the tag attached by any viewer within 10 minutes is specified by referring to the "tag content" and "attached date and time" in the input information management table 413. As described above, in this example, a tag after a lapse of five minutes since the tag is attached is not in a currently effective state (is in a currently ineffective state or is stale), and thus the "tag attached within 10 minutes" can also be paraphrased as a "currently effective tag and a tag within five minutes after the tag becomes a currently ineffective state".

Then, when the content of the tag does not overlap the other tag input within 10 minutes (YES in step S120), next, the server 10 registers the input tag (attaches the input tag to the video) (step S130). Specifically, a new record is created in the input information management table 413, and information related to the input tag is set. Further, the "tag information" of a corresponding distributor in the user information table 411 is updated (the tag attached this time is added).

On the other hand, when the number of currently effective tags is equal to or more than three (NO in step S100), when one minute or longer has not elapsed after the previous tag by the same user is attached (NO in step S110), or when the content of the tag overlaps the other tag attached within 10 minutes (NO in step S120), the server 10 notifies an error to the user who inputs the tag (step S140). In this case, the input tag is not registered (is not attached to a video) and is discarded. In this way, in this example, the number of currently effective tags (fresh tags) that can be attached to one video is limited to three, and the number of tags that can be attached within one minute to one video by one user is limited to one, and the number of the same tags that can be attached within 10 minutes to one video is limited to one. Note that, in this example, another restriction (for example, a restriction on the number of characters, a restriction by an NG word, and the like) related to a content of a tag may be imposed.

When a tag is attached, the tag objects 741 and 841 corresponding to the attached tag are added to the tag display areas 74 and 84 of the distribution screen 70 of the corresponding distributor terminal 30 and the viewing screen 80 of each viewer terminal 30, respectively. In the tag display areas 74 and 84, the tag objects 741 and 841 corresponding to a currently effective tag are disposed and arranged in the left-right direction such that a currently effective tag on the left side is newer (an attached time is later). Therefore, the tag objects 741 and 841 corresponding to a newly attached tag are added to the left end in the tag display areas 74 and 84. Note that, when a tag becomes a currently ineffective state in response to a lapse of five minutes since the tag is attached, the corresponding tag objects 741 and 841 are deleted (for example, the corresponding tag objects 741 and 841 disappear with an animation effect moving in a right direction).

The tag objects 741 and 841 in this example display a content of a tag in a hashtag form in which "#" is added to a head of a character string. For example, when a content of a tag is "Tokyo tour", "#tokyotour" is displayed in the tag objects 741 and 841. The length of the tag objects 741 and 841 in the left-right direction is automatically adjusted according to the length of a character string displayed thereon.

Further, when the tag is attached, the comment objects 731 and 831 corresponding to a system comment notifying that the tag is attached can be displayed in the comment display areas 73 and 83 of the distribution screen 70 and the viewing screen 80. In the comment objects 731 and 831 corresponding to the system comment, the content of the attached tag is displayed together with an account name of a viewer who attaches (inputs) the tag, and a comment such as, for example, "xx tagged this distribution with "#tokyotour"." is displayed.

In this example, a tag attached to a video may be deleted by a distributor of the video. For example, deletion of a corresponding tag may be performed through an operation (for example, a long pressing operation and the like) for selecting the tag object 741 disposed in the tag display area 74 of the distribution screen 70. When a tag is deleted, a corresponding record in the input information management table 413 is deleted, and the tag is also deleted from the "tag information" in the user information table 411.

In this example, a tag attached to a video is used for displaying information related to the video being distributed in the top screen 60. For example, a tag attached to a video is used as a part of information related to the video in the individual display area 641 of the list display area 64.

Figure 14:
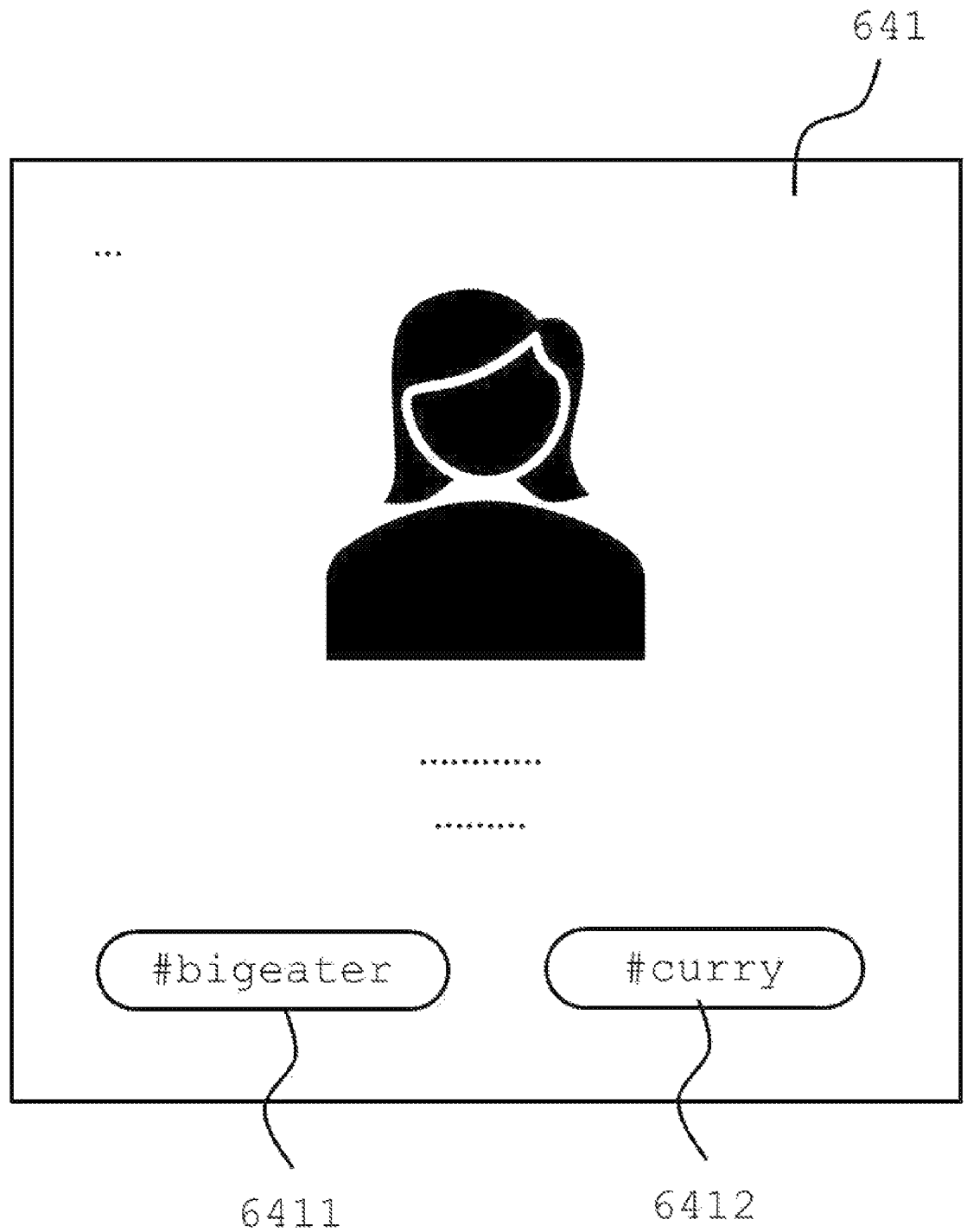
FIG. 14 is a diagram illustrating a content displayed in an individual display area 641.

FIG. 14 illustrates a content displayed in the individual display area 641. In the individual display area 641, an image preset by a distributor of video, an account name of the distributor, the number of viewers (current value), and the like are displayed, and, as illustrated, a first tag object 6411 and a second tag object 6412 are disposed and arranged in the left-right direction in a lower end portion thereof. The first tag object 6411 displays a classification text that is a classification of the distributor set by the distributor himself/herself (and is managed in the user information table 411) in a hashtag form (form in which "#" is added to a head of a character string). In the example in FIG. 14, "#bigeater" is displayed. Further, the second tag object 6412 similarly displays a currently effective tag attached to a corresponding video in the hashtag form (in the example in FIG. 14, "#curry" is displayed). Note that, when a plurality of currently effective tags are attached to a corresponding video, one tag selected according to a predetermined rule (for example, a randomly selected tag, a newest tag, or the like) is displayed. In this way, by displaying both of a classification text set by a distributor himself/herself and a tag input by a viewer in the individual display area 641, a user can know information related to a content of video (live distribution) more appropriately.

Figure 15:
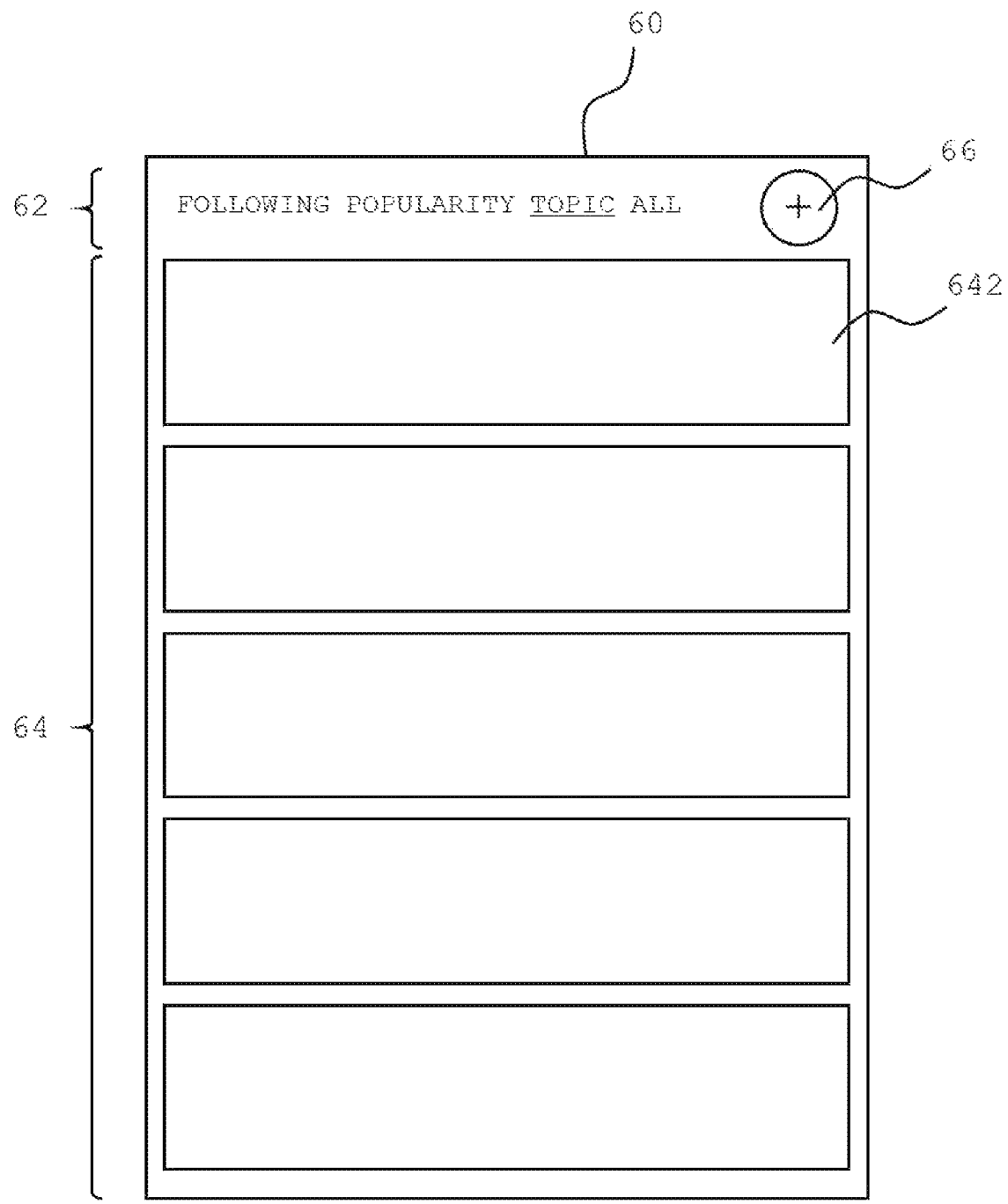
FIG. 15 is a diagram illustrating the top screen 60 when "topic" is selected in a selection area 62.

Further, for example, a tag attached to a video is used for extracting and selecting videos (live distribution) displayed in a list in the top screen 60. FIG. 15 illustrates the top screen 60 when "topic" is selected in the selection area 62. In the top screen 60 in this case, tags attached to any video are chronologically displayed in a list together with the videos to which the tags attached, in the list display area 64. In other words, in the list display area 64 when "topic" is selected in the selection area 62, tags arranged in descending order of attached date and time and corresponding videos (videos to which the tags are attached respectively) are displayed in a list.

In the list display area 64, a plurality of individual display areas 642 each displaying information related to an individual tag and a corresponding video are disposed and arranged in the up-down direction. When a tag is newly attached to any video being distributed, the corresponding individual display area 642 is added to an uppermost portion of the list display area 64.

Figure 16:
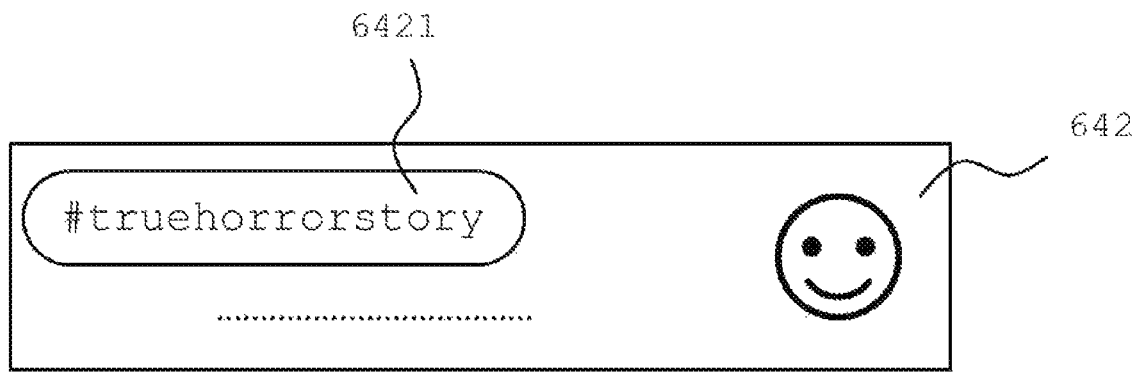
FIG. 16 is a diagram illustrating a content displayed in an individual display area 642.

FIG. 16 illustrates a content displayed in the individual display area 642. As illustrated, in the area 642, a tag object 6421 is disposed at an upper left corner, and a profile image, an account name, and the like of a distributor of a corresponding video (to which the tag is attached) are displayed. In the individual display area 642, a link to a corresponding video (live distribution) is set, and a user can start viewing a corresponding video by selecting any of the plurality of individual display areas 642 displayed in the list display area 64. Note that, in this example, for example, when a plurality of tags different from each other are attached to one video in a short period of time, the plurality of individual display areas 642 corresponding to these tags are disposed, and a link to the same video (live distribution) is set in these areas 642.

Figure 17:
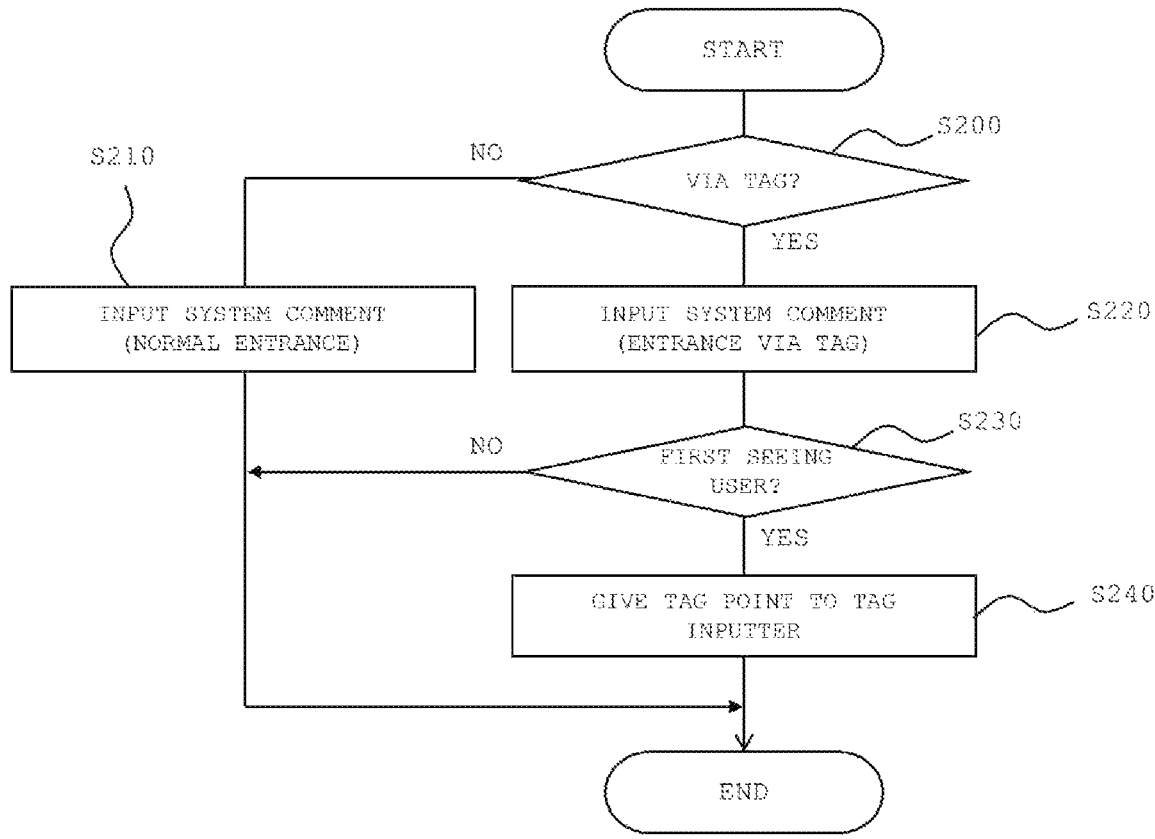
FIG. 17 is a flowchart illustrating processing executed by the server 10 in response to a start of viewing of video (entrance to distribution) by any user.

The operation related to attaching a tag to a video is described above. Next, an operation when a user starts viewing a video will be described. FIG. 17 is a flowchart illustrating processing executed by the server 10 in response to a start of viewing of video (entrance to live distribution) by any user. In response to a start of viewing of video by any user, as illustrated, when the user starts viewing the video not via a tag (NO in step S200), the server 10 first inputs a system comment related to a normal entrance by the user (step S210). In this example, a "start of viewing of video via a tag" specifically refers to a start of viewing of video via the list display area 64 in a state in which "topic" is selected in the selection area 62 of the top screen 60 (by selecting any of the plurality of individual display areas 642 displayed in a list in the area 64).

When the system comment related to the normal entrance is input, in the distributor terminal 30 and each viewer terminal 30, the comment objects 731 and 831 corresponding to the system comment can be displayed in the comment display areas 73 and 83 of the distribution screen 70 and the viewing screen 80. In the comment objects 731 and 831 corresponding to the system comment related to the normal entrance, an account name and the like of the user who has started viewing a video (has entered a distribution) are displayed.

On the other hand, when the user who starts viewing the video via a tag (YES in step S200), the server 10 next inputs a system comment related to an entrance via the tag (entrance using the tag) (step S220). When the system comment is input, in the corresponding distributor terminal 30 and each viewer terminal 30, the comment objects 731 and 831 corresponding to the system comment can be displayed in the comment display areas 73 and 83 of the distribution screen 70 and the viewing screen 80.

In this example, in the comment objects 731 and 831 corresponding to the system comment related to the entrance via the tag, the used tag (passed tag) is displayed in addition to an account name of the user who makes the entrance. The used tag is a tag corresponding to the individual display area 642 selected in the list display area 64 of the top screen 60. For example, in the comment objects 731 and 831, a comment indicating "A has now joined from "#xxx"" ("A" is a user who makes an entrance and "xxx" is a used tag) is displayed.

In response to an input of the system comment related to the entrance via the tag in such a manner, when the user who starts viewing is a first seeing user (user who views a video of this distributor for the first time) (YES in step S230), next, the server 10 gives a tag point to an inputter of the used tag (step S240). Specifically, the "tag point information" of the inputter is updated in the user information table 411. The inputter of the tag is specified by referring to the "inputter user account" in the input information management table 413.

In this example, the tag point information includes a tag point for each family (i.e., for each distributor) in which a corresponding user (inputter) is a family member, and a predetermined point is added to a tag point of a corresponding family in step S240. Note that, in this example, a ranking of the tag point (for example, the ranking in the same family) is set and announced periodically.

In this example, when an entrance is an entrance via a tag and a user who makes the entrance is a first seeing user, a corresponding system comment may be further input. The corresponding system comment includes, for example, an inputter of a used tag and the number of first seeing users who make an entrance via the used tag. For example, a comment indicating "there are 77 first seeing users who came from "#xxx" input by X" is displayed in the corresponding comment objects 731 and 831. Further, the corresponding system comment includes, for example, the number of first seeing users who make an entrance via each of all tags (tag at this time and another tag) input in a predetermined period (for example, a current month) by the inputter of the used tag. For example, a comment indicating "there are 888 first seeing users who came from any tags input by X in this month" is displayed in the corresponding comment objects 731 and 831.

The operation when the user starts viewing video is described above. Next, an operation related to a tweet (post of a message) on the SNS by a distributor will be described. In this example, as described above, a distribution start tweet and an automatic tag tweet are allowed as a tweet to an external SNS.

In this example, when a distributor has set an SNS account for a distribution start tweet, the server 10 posts a distribution start tweet by the set SNS account in response to a start of live distribution. For example, such a tweet may be posted by using an API provided by a target SNS.

Figure 18:
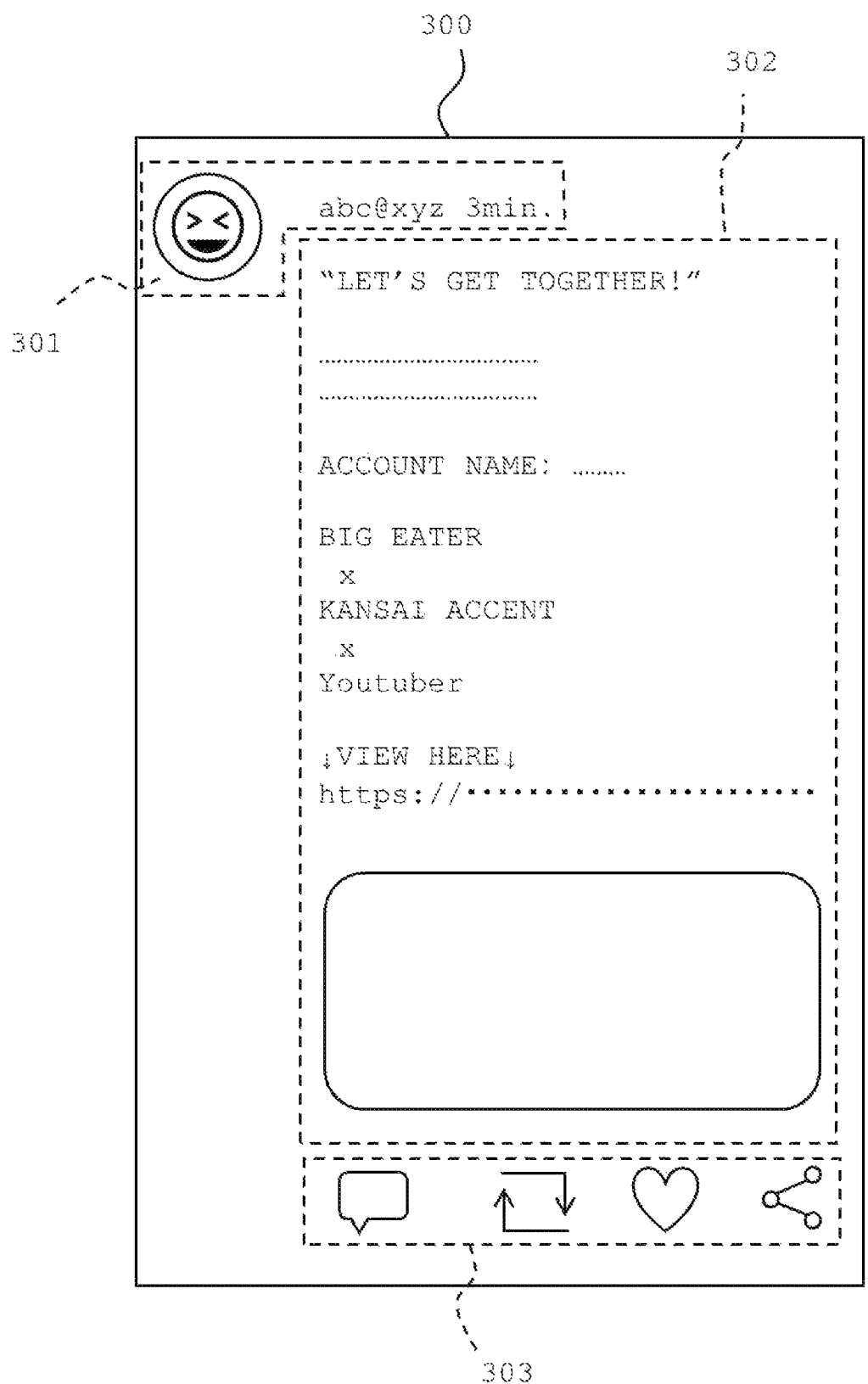
FIG. 18 is a diagram illustrating a tweet screen 300 corresponding to a distribution start tweet.

FIG. 18 illustrates a tweet screen 300 corresponding to a distribution start tweet. The screen 300 is a screen in a target SNS, and includes, as illustrated, a basic information display area 301 located at an upper left corner, a message display area 302, and an operation area 303 located below the area 302. The basic information display area 301 displays information related to an SNS account that tweets (such as a profile image and an SNS account name), information related to a tweet time, and the like. The message display area 302 displays a content of a tweet (posted message). The operation area 303 is configured as an area in which an instruction of action (such as a reply to the tweet, a retweet, a like, a share, and the like) is received.

In this example, as illustrated in FIG. 18, a content of the distribution start tweet (content of the message display area 302) includes fixed text such as "Let's get together!", a distribution title of corresponding distribution, an account name of a distributor (in a live video distribution service), a classification text of the distributor (managed in the user information table 411), an URL of a destination, an image preset by the distributor, and the like. Such a content of the tweet is automatically generated by the server 10. The URL of the destination is an URL of a website of the live video distribution service, and a link to the URL is also set in the image included in the tweet. When a user of the SNS who views the tweet selects the URL or the image included in the content of the tweet, the user is guided to the website of the live video distribution service as a destination. In the website, a part of a corresponding video (live distribution) is reproduced for a predetermined period of time (for example, 15 seconds), and the user is then further guided to a website for downloading an application for the live video distribution service.

Figure 19:
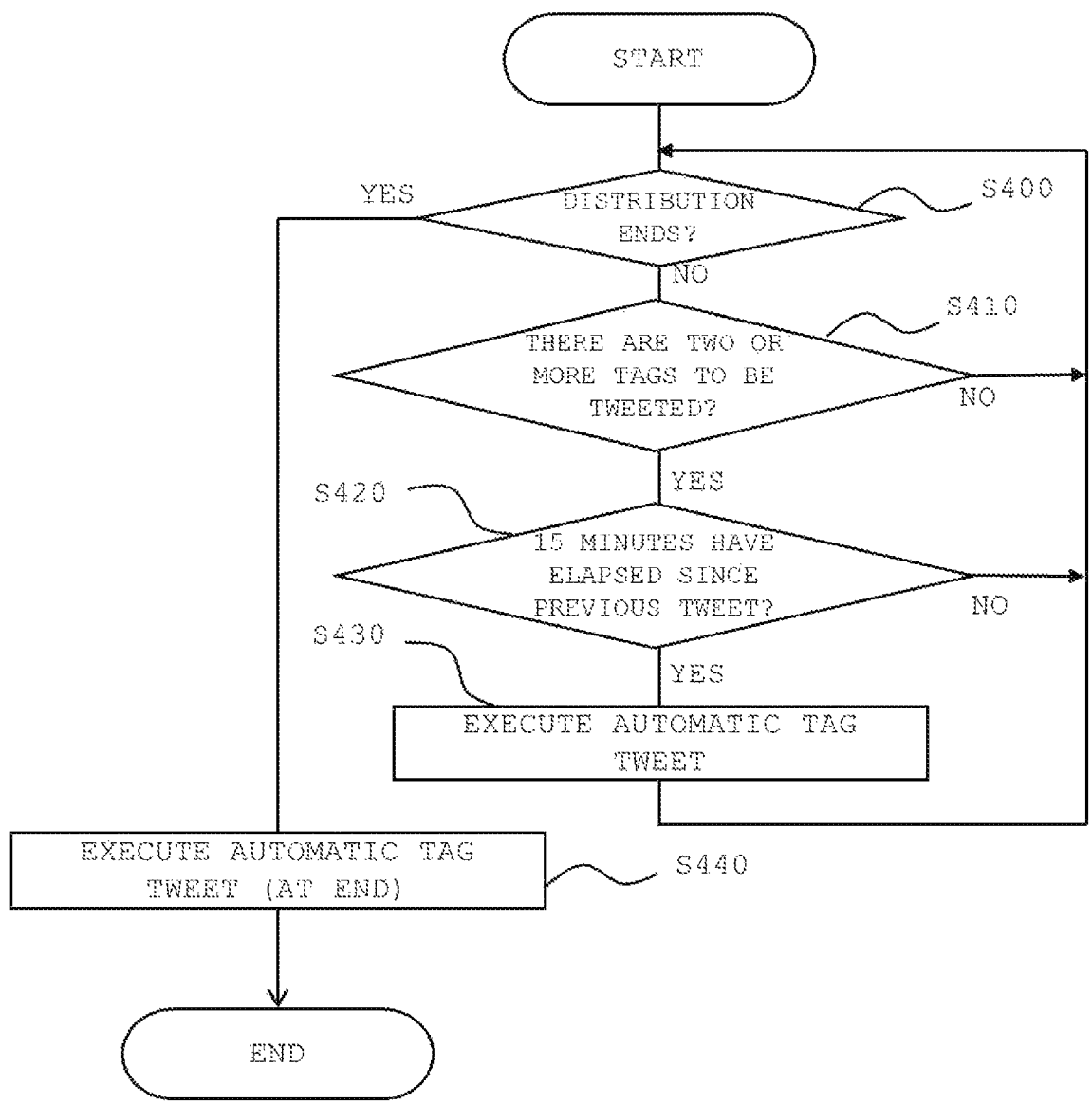
FIG. 19 is a flowchart illustrating processing executed by the server 10 when a distributor sets an SNS account for an automatic tag tweet.

Further, in this example, when a distributor has set an SNS account for an automatic tag tweet, the server 10 posts an automatic tag tweet. FIG. 19 is a flowchart illustrating processing executed by the server 10 when a distributor has set an SNS account for an automatic tag tweet. As illustrated, until live distribution ends (NO in step S400), when there are two or more tags to be tweeted (YES in step S410) and 15 minutes or longer have elapsed after a previous tweet (YES in step S420), the server 10 executes an automatic tag tweet (step S430). When the automatic tag tweet is executed, the "number of automatic tag tweets" in the distribution management table 412 is updated (added with 1), and a new record is also created in the post management table 414.

In this example, the tag as the tweet target is defined as a tag that satisfies all five conditions below.
(1) Tag that is not included in a message of a previous automatic tag tweet
(2) Tag after a lapse of three minutes since the tag is attached to a video
(3) Tag that is not included in a message of an automatic tag tweet posted within an hour for the same video (live distribution)
(4) Tag that is not deleted by a distributor
(5) Tag that does not include a predetermined NG word Note that "(1) Tag that is not included in a message of a previous automatic tag tweet" is specified by referring to the "post content" and "post date and time" in the post management table 414. Further, "(2) Tag after a lapse of three minutes since the tag is attached to a video" is specified by referring to the "attached date and time" in the input information management table 413. Further, "(3) Tag that is not included in a message of an automatic tag tweet posted within an hour for the same video" is specified by referring to the "post content" and the "post date and time" in the post management table 414. When the number of tags that satisfy all the five conditions described above is two or more after a lapse of 15 minutes since a previous automatic tag tweet, an automatic tag tweet is posted.

Figure 20:
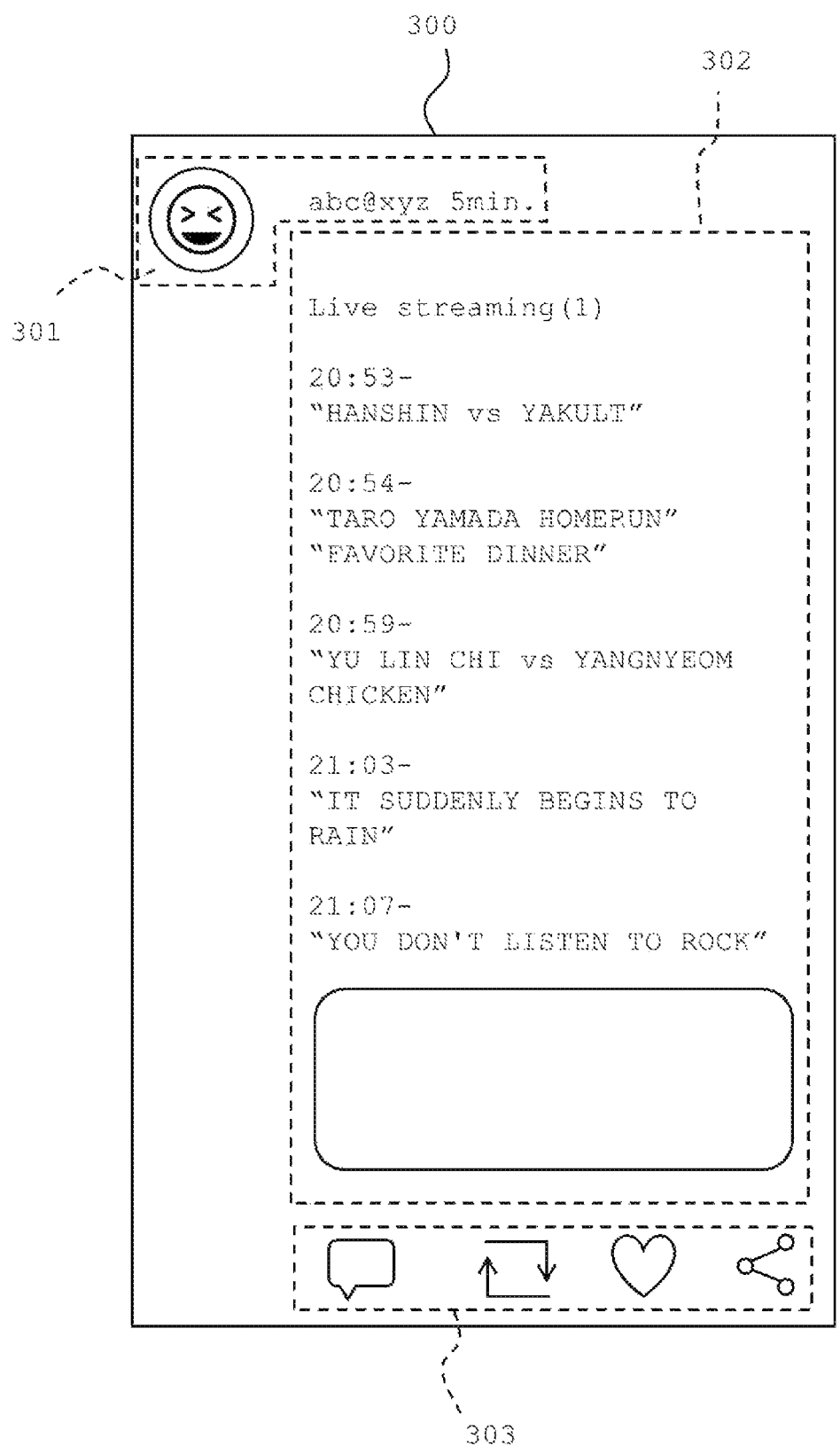
FIG. 20 is a diagram illustrating the tweet screen 300 corresponding to an automatic tag tweet.

FIG. 20 illustrates the tweet screen 300 corresponding to an automatic tag tweet. In this example, as illustrated, a content of the automatic tag tweet (content of the message display area 302) includes text such as "Live streaming (1)", an attached time and a content of a tag, an image preset by a distributor, and the like. Such a content of the tweet is automatically generated by the server 10 by referring to the input information management table 413 and the like.

In the automatic tag tweet, a number "(1)" added to an end of the fixed text of "Live streaming" indicates what number the automatic tag tweet is for the video. Further, in the automatic tag tweet, a content of a tag is disposed so as to correspond to an attached time of the tag. For example, a tag of "Hanshin vs Yakult" attached at 20:53 is disposed below text of "20:53–". Further, two tags of "Taro Yamada Homerun" and "Favorite dinner" attached at 20:54 are disposed below text of "20:54–". These tags are disposed such that the attached time thereof on the lower side is later than that on the upper side. In other words, a plurality of tags are arranged in the up-down direction in ascending order of the attached time in the automatic tag tweet. Note that, in addition to the tag, a capture image of video corresponding to an attached time may also be disposed so as to correspond to the attached time in the automatic tag tweet.

Further, in this example, when all of tags to be tweeted cannot be included in a content of an automatic tag tweet due to a restriction on the number of characters of a tweet, a part of the tags is excluded so that the number of characters in a content of the automatic tag tweet is within a range of the restriction on the number of characters.

Similarly to the distribution start tweet, a link to an URL of a destination is set in an image included in the automatic tag tweet. When a user of the SNS who views the tweet selects the image included in the content of the tweet, the user is guided to a website of the live video distribution service as a destination. In the website, a part of a corresponding video (live distribution) is reproduced for a predetermined period of time (for example, 15 seconds), and the user is then further guided to a website for downloading an application for the live video distribution service.

Referring back to the flowchart in FIG. 19, when the automatic tag tweet is executed, the processing returns to step S400. The server 10 waits until there are two or more tags to be tweeted and 15 minutes or longer have elapsed after a previous tweet, or, until the live distribution ends. When the number of tags to be tweeted is two or more and 15 minutes or longer have elapsed after the previous tweet, the server 10 executes (posts) the automatic tag tweet again.

Figure 21:
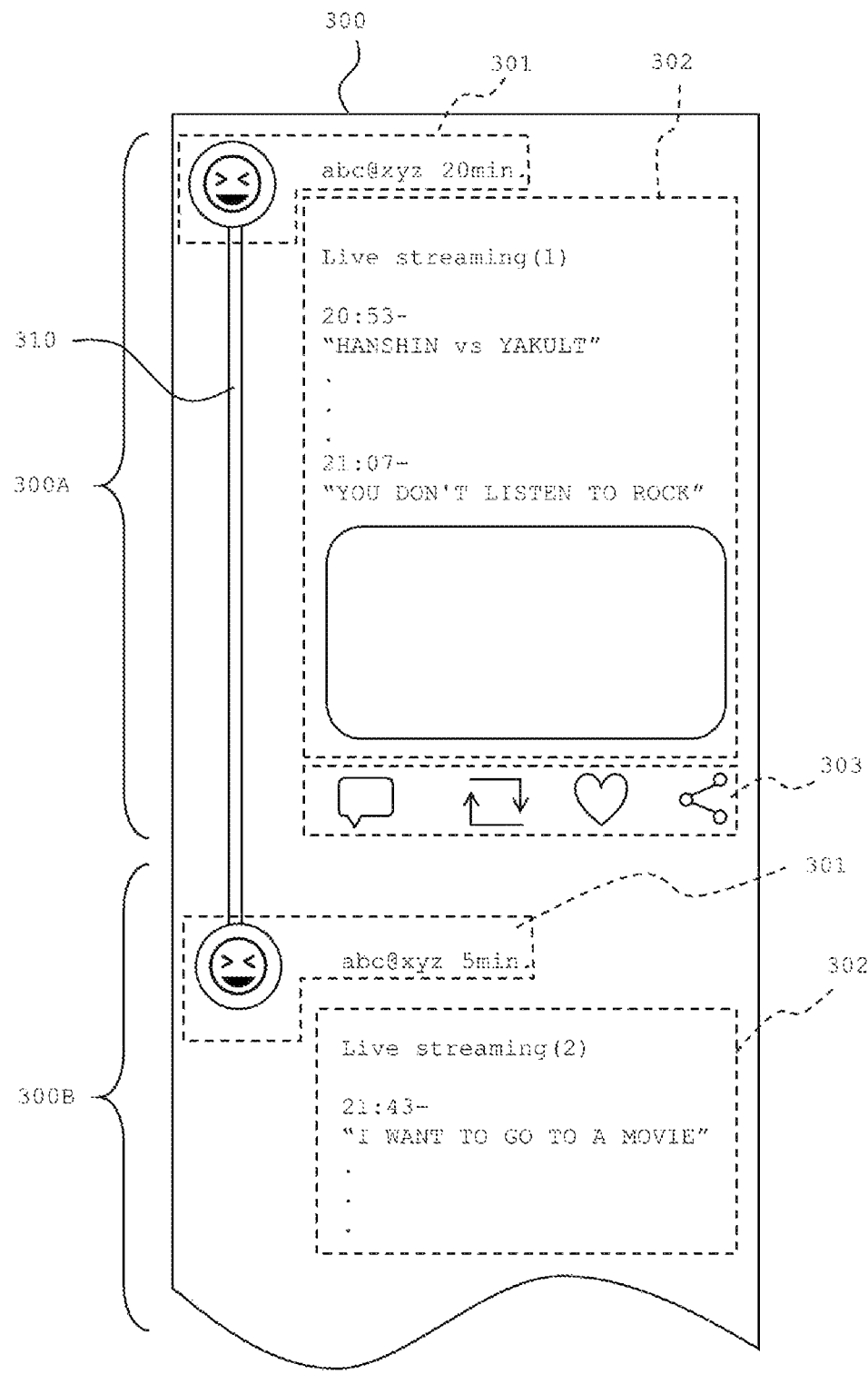
FIG. 21 is a diagram illustrating the tweet screen 300 corresponding to a first automatic tag tweet and a second automatic tag tweet tweeted as a reply to the first automatic tag tweet.

In this example, second and subsequent automatic tag tweets for the same video are posted as a reply to a preceding (previously tweeted) automatic tag tweet. FIG. 21 illustrates the tweet screen 300 corresponding to a first automatic tag tweet and a second automatic tag tweet that is posted as a reply to the first automatic tag tweet. As illustrated, the screen 300 includes an area 300A corresponding to the first automatic tag tweet, and an area 300B corresponding to the second automatic tag tweet that is coupled to a lower side of the area 300A. Further, a profile image of a contributor included in the basic information display area 301 in the area 300B corresponding to the second automatic tag tweet is coupled to a profile image of a contributor included in the basic information display area 301 in the area 300A corresponding to the first preceding automatic tag tweet, via a linear straight object 310.

Further, text of "Live streaming (2)" is displayed in the message display area 302 in the area 300B corresponding to the second automatic tag tweet, and a number (2) at an end of the fixed text of "Live streaming" indicates that the corresponding tweet is the second automatic tag tweet.

Such an automatic tag tweet is executed until the live distribution ends, and a new automatic tag tweet is repeatedly posted as a reply to a preceding automatic tag tweet.

Referring back to the flowchart in FIG. 19, when the live distribution ends (YES in step S400), the server 10 executes the automatic tag tweet (at end) (step S440). A remaining (not yet tweeted) tag as a tweet target attached until the live distribution ends is included in a content of the automatic tag tweet (at end) which is posted at the end of the live distribution.

The operation related to a tweet (post of a message) on the SNS by a distributor is described above. Next, an operation when a distributor ends distribution will be described. As described above, when the distributor selects the distribution stop button 76 on the distribution screen 70, the live distribution of the video ends. When the live distribution of the video ends, the server 10 sets a distribution point for the distribution. In this example, the distribution point is calculated based on the number of viewers (maximum value), the number of likes, the number of comments, the number of automatic tag tweets, and an item point. The distribution point is configured to increase as the number of viewers (maximum value), the number of likes, the number of comments, the number of automatic tag tweets, and an item point increase. In this way, in this example, it can be said that a distribution point is given as a reward to the distributor based on the automatic tag tweet. The calculated distribution point is set in the distribution management table 412.

Figure 22:
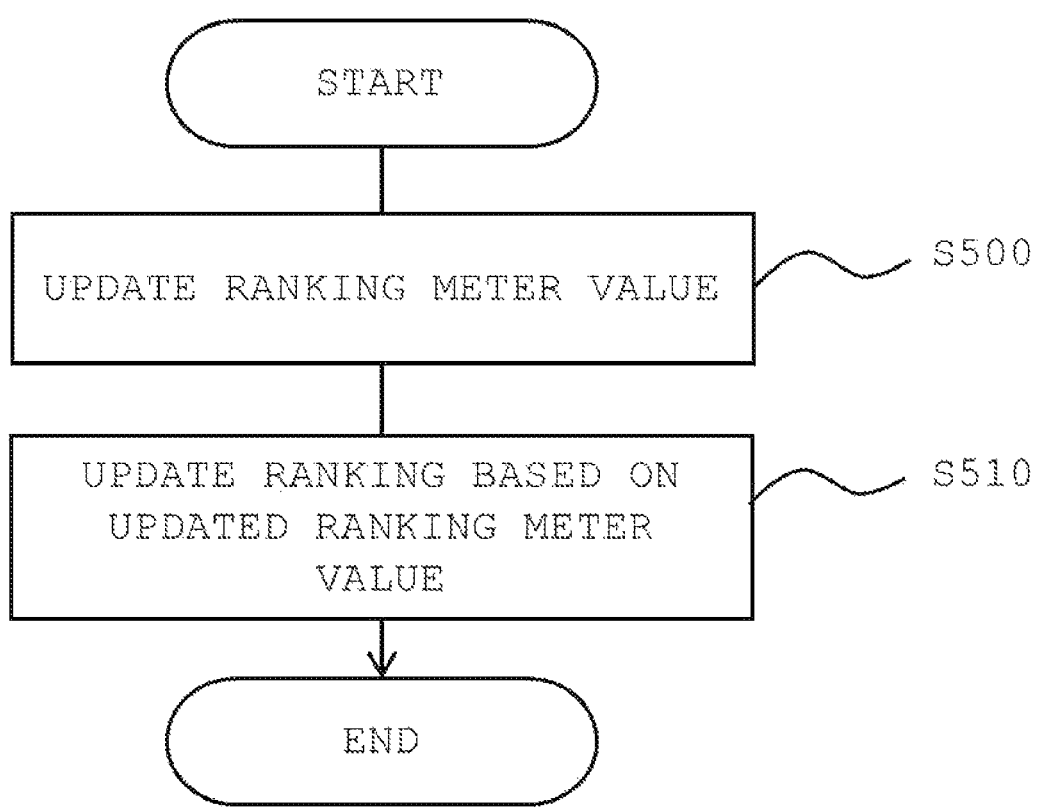
FIG. 22 is a flowchart illustrating processing executed by the server 10 when a ranking is updated.

Further, in this example, a ranking on the current day is determined (updated) based on a distribution point acquired by a user on the previous day. FIG. 22 is a flowchart illustrating processing executed by the server 10 when a ranking of each user is updated. The processing is executed in the middle of every night (for example, 3 o'clock every morning).

First, as illustrated, the server 10 updates a ranking meter value of each user (step S500). FIG. 23 illustrates an update rule for a ranking meter value. As illustrated, in this example, a ranking meter value fluctuates based on a rating of a distribution point acquired by a user on the previous day within a ranking band to which the user belongs. The distribution point acquired by a specific user on the previous day is calculated by referring to the "distributor user account", the "distribution date and time", and the "distribution point" in the distribution management table 412. Note that, when the user performs distribution for a plurality of times in one day, a distribution point acquired in each of the plurality of times of the distribution is added together.

Specifically, as illustrated in FIG. 23, first, when a rating of a distribution point within a ranking band is included in the top 10%, a fluctuation in ranking meter value is "+2" (points increased by two) in an update rule for a ranking meter value. Similarly, a fluctuation when the rating is included in the top 11 to 30% (remaining 20% after subtracting the top 10% from the top 30%) is "+1", a fluctuation when the rating is included in the middle 30% (top 31 to 60%) is "±0" (no increase or decrease), and a fluctuation when the rating is included in the bottom 40% is "−1" (points decreased by one). Note that, when no distribution is performed on the previous day, a fluctuation in ranking meter value is "−1" regardless of the rating within the ranking band.

In step S500, a ranking meter value of each user is updated according to the update rule illustrated in FIG. 23. Note that, when a user has a ranking meter value that is negative and a fluctuation in ranking meter value this time is an increase (specifically, +2 or +1), the ranking meter value may be cleared to zero and then increased from there. In other words, for example, when a fluctuation this time of a user whose current value of the ranking meter value is "−1" is "+2", the ranking meter value is cleared to zero and then increased by two, and the ranking meter value after the fluctuation is "+2" (instead of "+1"). In this way, even when a user has a ranking meter value that is negative (for example, a user having low distribution frequency), the ranking meter value can be increased all at once, and thus distribution of live video is promoted.

Referring back to the flowchart in FIG. 22, when the ranking meter value of each user is updated, the server 10 then updates a ranking, based on the updated ranking meter value (step S510). FIG. 24 is a diagram illustrating a correspondence relationship between an update content of a ranking and a necessary ranking meter value. As illustrated, first, a ranking meter value needed when a ranking increases to another ranking band (in other words, when the ranking increases from the highest ranking within each ranking band) is +4. In other words, a user belonging to the highest ranking (for example, A+) within each ranking band moves up in ranking to the lowest ranking (for example, S−) within a next higher ranking band when the ranking meter value becomes +4. Further, a ranking meter value needed when a ranking increases within the same ranking band (in other words, when the ranking increases from the middle or lowest ranking within each ranking band) is +2. In other words, a user belonging to the middle or lowest ranking (for example, B or B−) within each ranking band moves up in ranking to a next higher ranking (for example, B+ or B) within the same ranking band when the ranking meter value is +2.

Similarly, as illustrated in FIG. 24, a ranking meter value needed when a ranking decreases within the same ranking band (in other words, when the ranking decreases from the highest or middle ranking within each ranking band) is −2. In other words, a user belonging to the highest or middle ranking (for example, B+ or B) within each ranking band moves down in ranking to a next lower ranking (for example, B or B−) within the same ranking band when the ranking meter value is −2. Further, a ranking meter value needed when a ranking decreases to another ranking band is −6. In other words, a user belonging to the lowest ranking (for example, A−) within each ranking band moves down in ranking to the highest ranking (for example, B+) within a next lower ranking band when the ranking meter value is −6. In this way, in this example, an increase and a decrease in ranking to another ranking band have a larger absolute value of the necessary ranking meter value than that of an increase and a decrease in ranking within the same ranking band. As a result, an abrupt increase and an abrupt decrease in ranking within a short period are prevented.

In step S510, updating of a ranking is performed based on the ranking meter value according to the correspondence relationship illustrated in FIG. 24. Note that the ranking meter value of the user whose ranking has been updated (the user whose ranking has increased or decreased) is cleared to zero.

Figure 25:
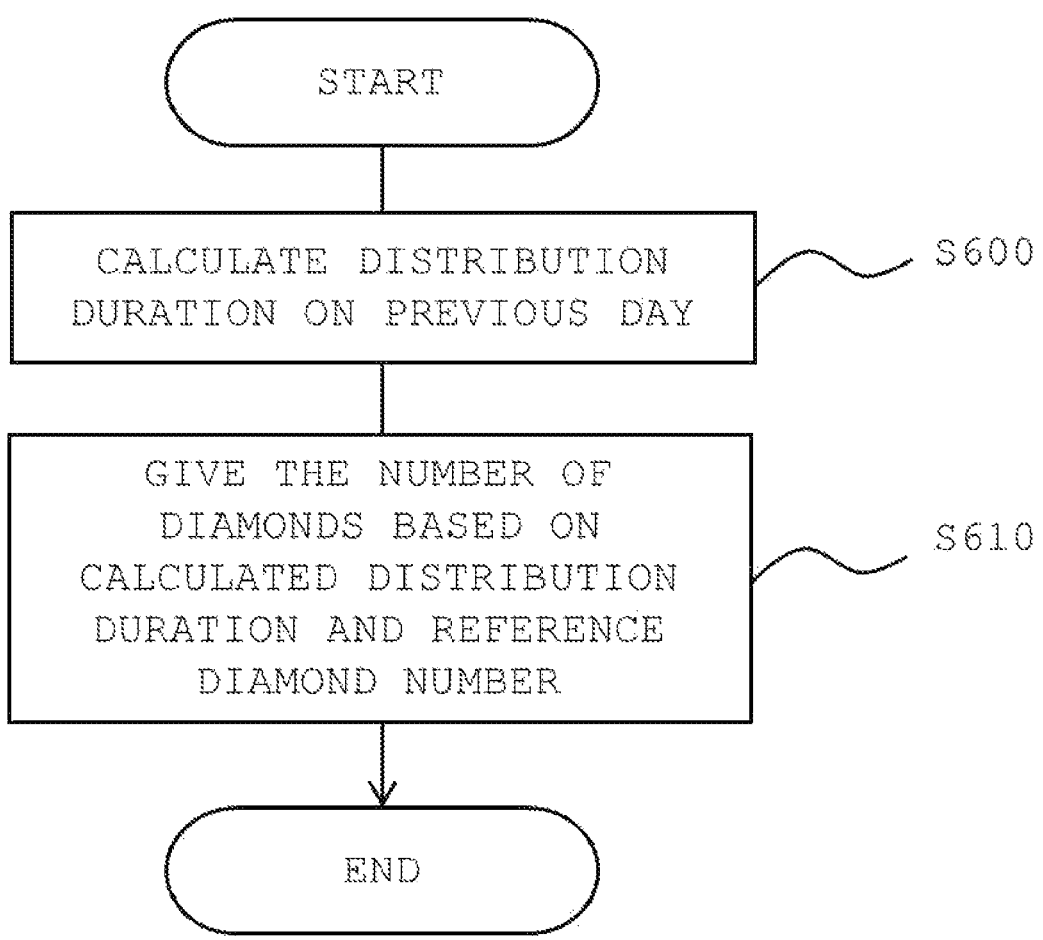
FIG. 25 is a flowchart illustrating processing executed by the server 10 when a virtual diamond is given.

Further, in this example, a virtual diamond that is a reward for a user as a distributor is given based on a distribution duration on a previous day and a ranking (a ranking on the previous day). FIG. 25 is a flowchart illustrating processing executed by the server 10 when a diamond is given to each distributor. The processing is executed in the middle of every night, and is, for example, executed at a time (for example, 0 o'clock every morning) before the processing executed when a ranking of each user is updated, which is illustrated in FIG. 22.

First, as illustrated, the server 10 calculates a distribution duration on a previous day of each user (step S600). Specifically, the distribution duration on the previous day of a specific user is calculated by referring to the "distributor user account" and the "distribution date and time" in the distribution management table 412. When the user performs distribution for a plurality of times in one day, a distribution duration of each of the plurality of times of the distribution is added together.

Then, the server 10 gives, to each user, the number of diamonds based on the calculated distribution duration and a reference diamond number (step S610). Specifically, the number of diamonds acquired by multiplying the calculated distribution duration by the reference diamond number is given to each user. The reference diamond number is preset for each ranking so as to increase with a higher ranking, and a reference diamond number corresponding to a ranking on a previous day of each user is applied. When a diamond is given to the user, the "number of held diamonds" in the user information table 411 is updated. In this example, the diamond can be exchanged for a coin or real currency.

Figure 26:
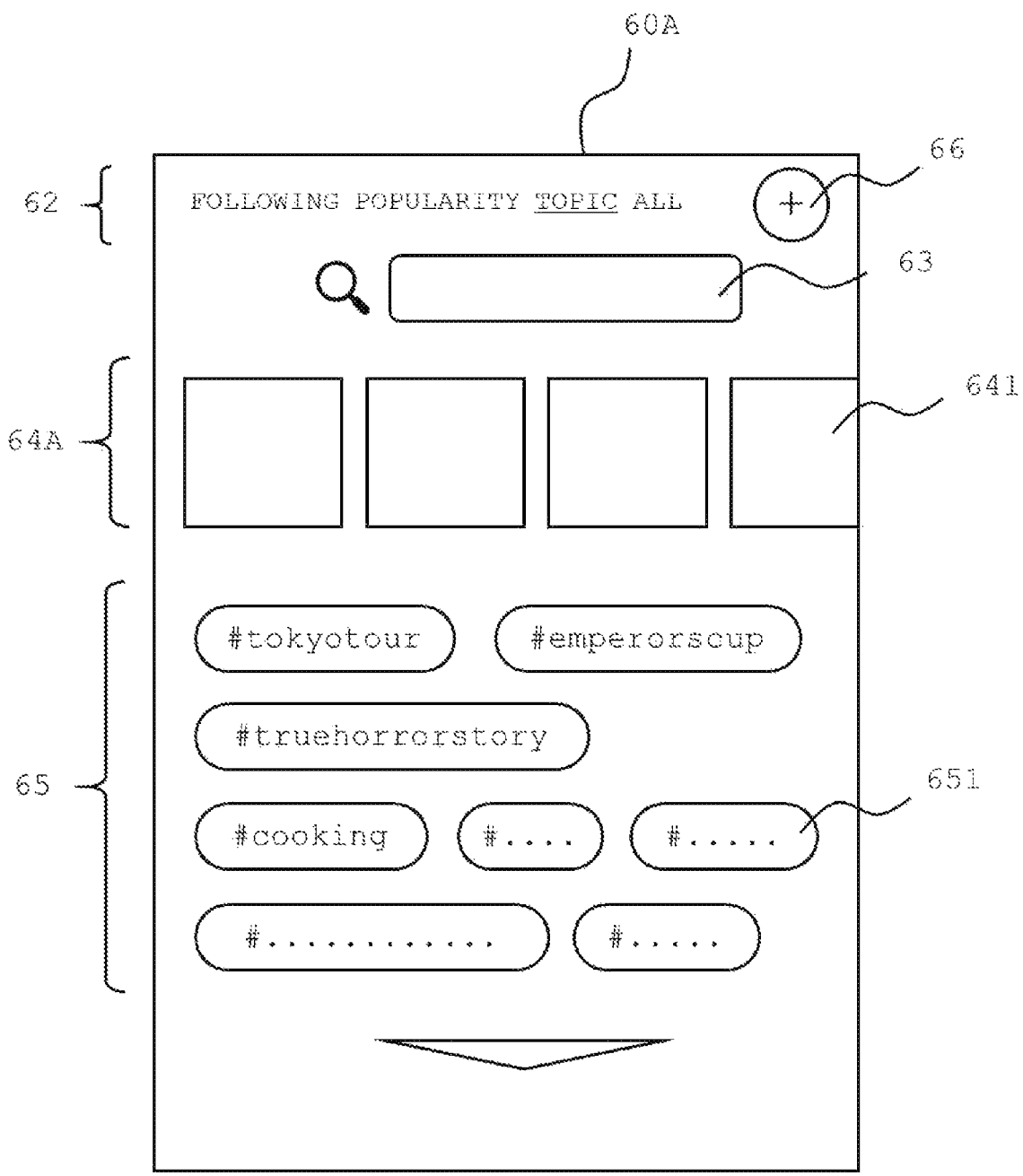
FIG. 26 is a diagram illustrating a top screen 60A in another example.

The top screen 60 in the example described above is one example of a screen that displays information related to a video being distributed, and another screen may be adopted in another example of the present embodiment. FIG. 26 illustrates a top screen 60A in another example of the present embodiment when "topic" is selected in the selection area 62. The top screen 60A in this case includes a tag search area 63 for searching for a tag, a first list display area 64A for displaying a list of videos to which the most popular tag (a tag which is attached to the greatest number of videos as a currently effective tag) is attached, and a second list display area 65 for displaying a list of currently effective tags attached to a plurality of videos being distributed.

In the first list display area 64A, a plurality of individual display areas 641 each displaying information related to an individual video are disposed and arranged in the left-right direction. When any of the plurality of individual display areas 641 is selected, viewing of a corresponding video starts. The start of viewing in response to the selection of the individual display area 641 is determined as an entrance (start of viewing) via a tag.

A plurality of tag objects 651 each corresponding to an individual tag are disposed in the second list display area 65. In the area 65, the tag object 651 corresponding to a tag attached to a greater number of videos is disposed on an upper side, and the tag object 651 corresponding to a tag attached to a greater number of videos among the tag objects 651 disposed at the same height is located on a left side.

Figure 27:
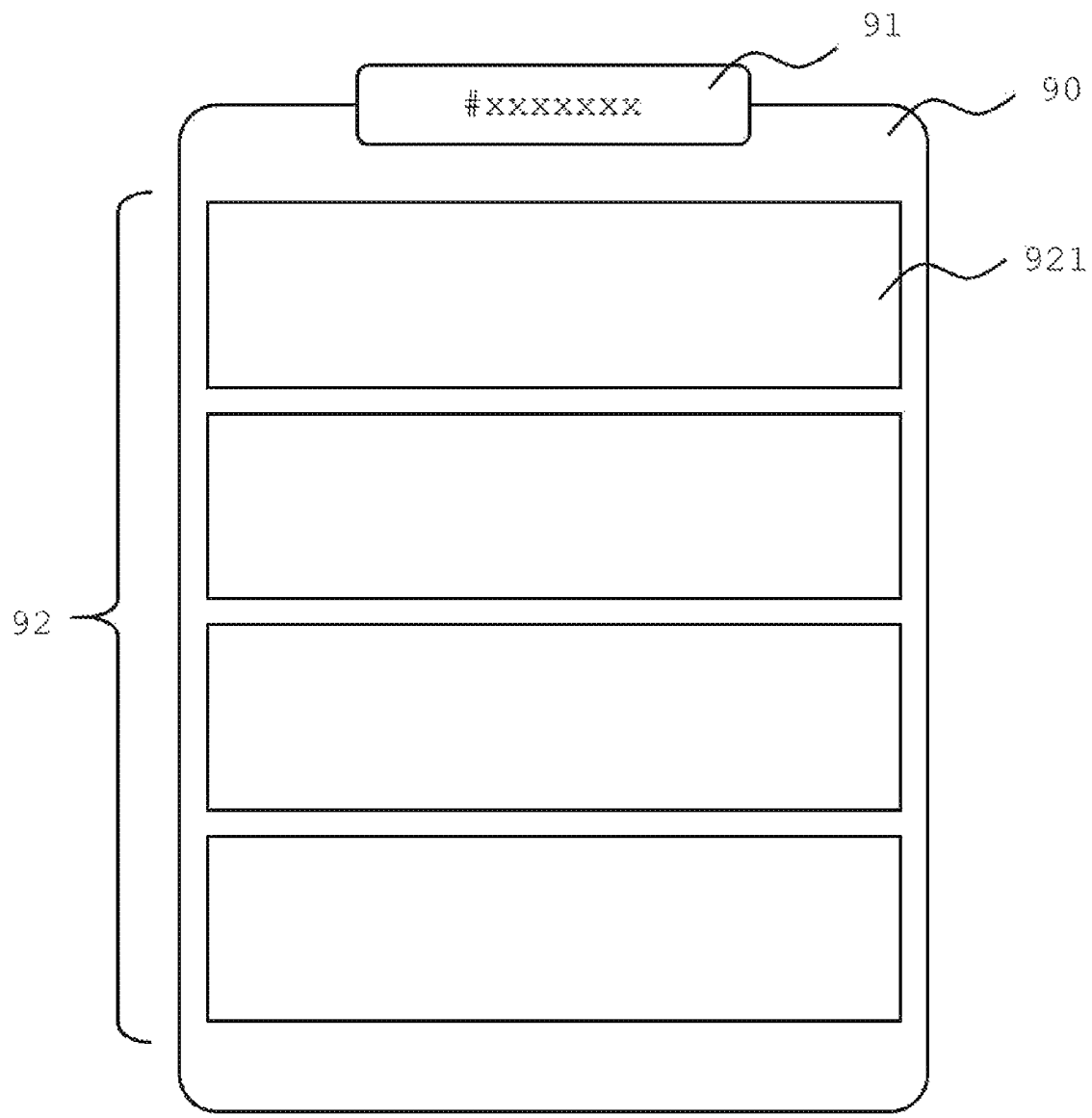
FIG. 27 is a diagram illustrating a tag-specific video list screen 90.

When any of the plurality of tag objects 651 is selected, a tag-specific video list screen 90 illustrated in FIG. 27 is displayed over the top screen 60A. The screen 90 is a screen for displaying a list of videos to which a specific tag is attached as a currently effective tag, and includes, as illustrated, a tag display object 91 that displays a content of a tag designated as a specific tag (a content of a tag corresponding to the selected tag object 651), and a list display area 92 for displaying a list of videos to which the designated tag is attached as a currently effective tag. In the area 92, a plurality of individual display areas 921 each displaying information related to an individual video are disposed and arranged in the up-down direction. The individual display area 921 displays a profile image, an account name, and the like of a distributor. When any of the plurality of individual display areas 921 is selected, viewing of a corresponding video starts. The start of viewing in response to the selection of the individual display area 921 is determined as an entrance (start of viewing) via a tag. Note that, also when a currently effective tag is searched and selected via the tag search area 63, the tag-specific video list screen 90 corresponding to the selected tag is displayed.

In the example described above, a tag is attached to a video by a viewer of the video, but additionally, a tag may be attached by a distributor himself/herself who is distributing the video.

In the example described above, an input of a tag may be accompanied by consumption of a coin. In this case, as the number of consumed coins increases, an effective period of a tag may be increased.

In the example described above, an archive of video distributed live may be able to be viewed later. In this case, since all tags attached during distribution are managed in the input information management table 413, the archived video may be able to be searched by using the tag. For example, in a screen for displaying a profile of a distributor and the like, a list of tags (managed in the "tag information" in the user information table 411) input by a viewer in the past is displayed, and, when any of the tags is selected via the list, an archived video to which the selected tag is attached may be searched and displayed.

In the example described above, "a lapse of 15 minutes or longer since a previous tweet" is one of conditions for posting an automatic tag tweet, but such a time interval (15 minutes) may be a variable value. For example, even in a case where an elapsed time since a previous tweet is less than 15 minutes, when the number of tags to be tweeted is equal to or more than a predetermined value (for example, three), an automatic tag tweet may be executed. Further, a distributor may be able to set a frequency of an automatic tag tweet, and may be able to select a frequency from among, for example, (1) every time a tag to be tweeted occurs, (2) a predetermined time interval, and (3) every time a tag that is popular in the entire live video distribution service (such a tag may be specified based on the number of videos to which the tag serving as a currently effective tag is attached, for example) occurs. Further, in another example of the present embodiment, a (manual) tag tweet is executed instead of an automatic tag tweet in response to an instruction by a distributor, and a content of the tag tweet is automatically generated based on a tag to be tweeted.

A content of an automatic tag tweet in the example described above is an exemplification, and a content of a tweet in various kinds of forms based on a tag to be tweeted is automatically generated in another example of the present embodiment. For example, at least a part of tags to be tweeted (for example, a (trend) tag that is popular in the SNS, and the like) may be displayed in a hashtag form in the SNS (for example, a form in which "#" is added to a head, and the like). Further, an area for guiding to a website and the like (for example, a portion of a tweeter card in Twitter, and the like) may be automatically generated based on various kinds of information including a tag to be tweeted. Further, a content of a tweet can also be configured to be generated based on other input information such as an item, a comment, and a "like" instead of or in addition to the tag.

In the example described above, information acquired from the SNS may be displayed on a screen such as the distribution screen 70 and/or the viewing screen 80, and an operation on the SNS may be performed via the screen. For example, the distribution screen 70 and/or the viewing screen 80 may be configured to display a content of an automatic tag tweet by a distributor of a corresponding video, and also receive an operation (such as a reply, a retweet, and a like) of the SNS on the tweet.

The video distribution server 10 in the present embodiment described above generates a message based on input information (for example, a tag) by a viewer during distribution of video, and posts the message on an SNS (for example, tweets) by a distributor of the video, and thus allows a user of the SNS to know a situation and an atmosphere of live distribution in a video distribution service. As a result, entry of a new viewer into the live video distribution service may be promoted.

The processing and procedures described in the specification may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, and a magnetic disk. Further, the processing and procedures described in the specification can be implemented as a computer program corresponding to the processing and procedures and can be executed by various kinds of computers.

Although the processing and procedures described in the specification are described as being executed by a single device, a single piece of software, a single component, or a single module, such processing or procedures can be executed by a plurality of devices, a plurality of pieces of software, a plurality of components, and/or a plurality of modules. Further, the software and hardware elements described in the specification can also be realized by integrating them into fewer components, or breaking them down into more components.

In the specification, when a component of the invention is described as being either one or a plurality of things, or when it is described without any limitation as to number, the component may be either one or a plurality of things, except when the context indicates otherwise.

What is claimed is:

1. A system for providing a live video distribution service, the system comprising:
one or more computer processors that:
distribute a video provided by a distributor to user terminals operated by viewers;
manage input information input by each of the user terminals during distribution of the video;
generate, based on the input information, a message related to the video; and
automatically post the message on an SNS, using an account of the SNS owned by the distributor, wherein
the input information includes one or more tags, and
the one or more computer processors repeatedly execute:
determining whether a number of the tags is two or more based on a predetermined condition, and
upon determining that the number of the tags is two or more, after a predetermined time has elapsed from a previous posting, automatically posting the message including the tags.

2. The system according to claim 1, wherein
the one or more processors generate the message such that pieces of the input information are arranged in the message according to an input order.

3. The system according to claim 1, wherein
the one or more processors generate the message such that pieces of the input information, each being associated with a corresponding input time, are included in the message.

4. The system according to claim 1, wherein
the one or more processors generates the message without using any input information input within a predetermined period of time.

5. The system according to claim 1, wherein
the one or more computer processors give a reward to the distributor in response to posting the message on the SNS.

6. The system according to claim 1, wherein
the one or more processors manage, as the input information, the tags associated with the video being distributed.

7. A method for providing a live video distribution service being executed by one or more computers, the method comprising:
distributing a video provided by a distributor to user terminals operated by viewers;
managing input information input by each of the user terminals during distribution of the video;
generating, based on the input information, a message related to the video; and
automatically posting the message on an SNS, using an account of the SNS owned by the distributor, wherein
the input information includes one or more tag, and
the method further comprises repeatedly executing:
determining whether a number of the tags is two or more based on a predetermined condition, and
upon determining that the number of the tags is two or more, after a predetermined time has elapsed from a previous posting, automatically posting the message including the tags.

8. A non-transitory computer-readable medium including a program for providing a live video distribution service, wherein the program causes one or more computers to execute:
distributing a video provided by a distributor to user terminals operated by viewers;
managing input information input by each of the user terminals during distribution of the video;
generating, based on the input information, a message related to the video; and
automatically posting the message on an SNS, using an account of the SNS owned by the distributor, wherein
the input information includes one or more tag, and
the program further causes the one or more computers to repeatedly execute:
determining whether a number of the tags is two or more based on a predetermined condition, and
upon determining that the number of the tags is two or more, after a predetermined time has elapsed from a previous posting, automatically posting the message including the tags.

9. The system according to claim 1, wherein the account is a user account that identifies each user in an SNS service.

10. The system according to claim 1, wherein the video is provided based on an operation in a computer operated by the distributor.

11. The system according to claim 1, wherein
the one or more processors generate, based on the input information, a reply message in reply to the message, and
the one or more processors post the reply message after the posting the message.

12. The method according to claim 7 further comprising:
generating, based on the input information, a reply message in reply to the message; and
posting the reply message after the posting the message.

13. The non-transitory computer-readable medium according to claim 8, wherein the program causes the one or more computers to execute:
generating, based on the input information, a reply message in reply to the message; and
posting the reply message after the posting the message.

14. The system according to claim 1, wherein
the predetermined condition is at least one of:
the tags are not included in a message of a previous posting;
a predetermined time has passed since the tags are attached to the video;
the tags are not included in another posting that has executed for the same video within a predetermined period of time:
the tags have not been deleted by the distributor; and
the tags do not include a predetermined NG word.

15. The system according to claim 1, wherein
the one or more processors exclude a part of the tags such that a number of characters of the message including the tags do not exceed a limit of a number of characters to be posted.

* * * * *